US005126189A

United States Patent [19]

Tanny et al.

[11] Patent Number: 5,126,189

[45] Date of Patent: Jun. 30, 1992

[54] HYDROPHOBIC MICROPOROUS MEMBRANE

[75] Inventors: Gerald B. Tanny, Rehovot; Yitzchak Keningsberg, Petach Tikvah; Ehud Shchori, Rehovot, all of Israel

[73] Assignee: Gelman Sciences, Inc., Ann Arbor, Mich.

[21] Appl. No.: 40,935

[22] Filed: Apr. 21, 1987

[51] Int. Cl.[5] .......................... B05D 3/06; B32B 5/28; B32B 27/40; B32B 31/12; B32B 31/28

[52] U.S. Cl. .................................. 428/220; 156/272.6; 156/273.3; 156/273.5; 156/275.5; 156/307.3; 156/307.7; 250/492.3; 427/35; 427/40; 427/42; 427/44; 427/54.1; 428/252; 428/265; 428/267; 428/287; 428/288; 428/290; 428/308.4; 428/308.8; 428/315.5; 428/315.9; 428/422; 428/423.5; 428/423.7; 428/425.1; 428/904

[58] Field of Search ............... 156/272.6, 273.3, 273.5, 156/275.5; 250/492.3; 427/35, 40, 42, 44, 54.1; 428/220, 252, 265, 267, 287, 288, 290, 308.4, 308.8, 315.5, 315.9

[56] References Cited

U.S. PATENT DOCUMENTS

| | | | |
|---|---|---|---|
| 3,031,721 | 5/1962 | Friedlander . | |
| 3,256,219 | 6/1966 | Will . | |
| 3,275,548 | 9/1966 | Walters . | |
| 3,357,158 | 12/1967 | Hollis . | |
| 3,679,783 | 7/1972 | McGarr . | |
| 3,709,805 | 1/1973 | Krauch et al. . | |
| 3,860.680 | 1/1975 | Warwicker et al. . | |
| 3,880,763 | 4/1975 | Chapman et al. . | |
| 3,892,665 | 7/1975 | Steigelmann et al. . | |
| 3,966,489 | 6/1976 | Barrett et al. . | |
| 3,991,017 | 11/1976 | Barrett et al. . | |
| 4,001,462 | 1/1977 | Blin et al. . | |
| 4,039,414 | 8/1977 | McGinniss . | |
| 4.048,036 | 9/1977 | Prucnal . | |
| 4,075,366 | 2/1978 | Packer et al. . | |
| 4,125,503 | 11/1978 | McCarty et al. . | |
| 4,148,987 | 4/1979 | Winey . | |
| 4,152,496 | 5/1979 | Barrett et al. . | |
| 4,178,221 | 12/1979 | Boutin et al. . | |
| 4,268,463 | 5/1981 | Aoyagi et al. . | |
| 4,287,275 | 9/1981 | Davis . | |
| 4,289,821 | 9/1981 | Gray et al. . | |
| 4,306,955 | 12/1981 | Neel et al. . | |
| 4,360,541 | 11/1982 | Costanza et al. . | |
| 4,365,049 | 12/1982 | Tsunoda et al. | 526/245 |
| 4,404,073 | 9/1983 | Bartissol et al. . | |
| 4,464,485 | 8/1984 | Kishima et al. | 521/64 |
| 4,466,931 | 8/1984 | Tanny | 264/22 |
| 4,535,008 | 8/1985 | Naka et al. | 427/246 |
| 4,560,611 | 12/1985 | Naka et al. | 428/266 |
| 4,642,244 | 2/1987 | Tripp et al. | 427/44 |

FOREIGN PATENT DOCUMENTS

| | | |
|---|---|---|
| 49-011261 | 5/1974 | Japan . |
| 56-034329 | 8/1981 | Japan . |
| 60-59178 | 4/1985 | Japan . |
| 60-90212 | 5/1985 | Japan . |
| 932125 | 7/1963 | United Kingdom . |
| 932126 | 7/1963 | United Kingdom . |
| 2025425 | 1/1980 | United Kingdom . |

OTHER PUBLICATIONS

Gupta, et al.-Solventless Fabric Coating by Radiation Curing, Part IV: Transfer Coatings on Non-Wovens, J. of Coated Fabrics, vol. 9 (Jul. 1979), pp. 12-25.

Lomax, The Design of Waterproof, Water Vapour--Permeable Fabrics, J. of Coated Fabrics, vol. 15 (Jul. 1985), pp. 40-66.

(List continued on next page.)

*Primary Examiner*—James C. Cannon

*Attorney, Agent, or Firm*—Krass & Young

[57] ABSTRACT

The invention is a membrane comprising polymerized monomer and oligomer components. A primary membrane oligomer component is selected from acrylic polyester urethanes, and a secondary membrane monomer component is selected from 1,1,3,3-tetramethylbutylacrylamide and perfluoromonomers and perfluoroacrylic monomers. The membrane is further characterized as being microporous, permeable and having a thickness of less than 0.1 inches.

24 Claims, 3 Drawing Sheets

OTHER PUBLICATIONS

Ramsey, "Fabric Scouring with Trichlorotrifluoroethane," Freon Solvents and Chemicals Technical Report RP-10 (Oct. '79).

UV Curing: Science and Technology, Editor S. P. Pappas, Technology Marketing Corp., pp. 3, 133-170 (1980).

Prane, Coatings and Adhesives: The Ubiquitous UV Curables, Polymer News, vol. 4, No. 4, pp. 175-179 (1978).

Prane, Coatings and Adhesives: More on UV Curables, Polymer News, vol. 4, No. 5, pp. 239-241 (1978).

Prane, Coatings and Adhesives: Casting Light on UV Curables, Polymer News, vol. 4, No. 6, pp. 268-269 (1978).

Prane, Coatings and Adhesives: UV Curables-The Living End, Polymer News, vol. 5, No. 1, pp. 36-39 (1978).

Prane, Coatings and Adhesives: A Creative Coatings Science Workshop, Polymer News, vol. 5, No. 2, pp. 53-57 (1978).

Prane, Coatings and Adhesives: Cationic UV Curables, Polymer News, vol. 5, No. 6, pp. 283-285 (1979).

Prane, Coatings and Adhesives: Radiation Curable Adhesives—Growth is Coming, Polymer News, vol. 6, No. 6, pp. 265-267 (1980).

HYDROPHOBIC MICROPOROUS MEMBRANE

This is a composite of application Ser. No. 778,970 filed Sep. 23, 1985, now abandoned and application Ser. No. 924,120 filed Oct. 29, 1986, now abandoned which is a continuation of application Ser. No. 778,969 filed Sep. 23, 1985, now abandoned.

BACKGROUND OF THE INVENTION

The subject invention relates to a microporous organic polymeric membrane and the method for manufacturing the same. By "microporous membrane" it is meant a fluid permeable sheet or film having pores with a pore size of from 0.02 to 15 microns and having a thickness of less than 0.1 inches.

Microporous membranes have great utility both as filtration media and as permselective barriers which retain particles or liquids while allowing the passage of gases and vapors. As barriers to bacteria, they are well known for their use in sterile filtration of liquids and gases in the medical, pharmaceutical and electronics industry. In other applications, the microporous membrane is utilized as a sterile hydrophobic vent, allowing the passage of vapor but preventing the passage of an aqueous solution.

There exists a number of additional areas in which the introduction of a microporous barrier would be useful but as to this date, no practical article exists. Modern medical techniques to reduce infection introduced in the operating room have more recently come to rely upon the use of operating room garments and surgical drapes fabricated from disposable nonwoven fabrics whose fibers have been made hydrophobic. These materials are in effect depth type filters, whose open spaces are far larger than bacteria, but whose density is such that the bacteria has a high probability of encountering and sticking to such a fiber. Even the best of such fibers do not retain more than 92 to 95% of the airborne bacteria. The use of "dense" coated fabric, on the other hand, is not possible because the garment or drape must breathe; that is, allow transport of air and water vapor. in order to avoid hyperthermia in the patient and provide comfort to the operating theater staff. The use of a microporous membrane (hydrophobic or hydrophylic) with a pore size appropriate to act as a bacterial barrier clearly suggests itself to such an application.

Other applications which require both the breathable aspect and the hydrophobicity include disposable sheets to protect bedding, breathable diaper exteriors and other like applications. Microporous membranes have not been commercially applied to these uses for reasons of cost associated with slow rates of production, and because they have not usually had the correct combination of barrier properties and mechanical flexibility and softness. Moreover, most such polymer films are mechanically flimsy and their practical use is only extended by bonding them to microporous fabrics or paper supports, thereby forming a laminate structure.

Methods exist for the preparation of such fabric or paper supported laminates. Where the microporous membrane can be formed as a free, stand alone film element, the laminate may be formed by direct dot gluing, heat embossing or the provision of an intermediary layer which is melted to join the layers by locking into the pores of both materials. All of these techniques have the disadvantage of "blinding" surface pores and reducing flow efficiency. Alternatively, under some circumstances the microporous membrane may be formed directly on the support material. A laminate of this type can only be formed provided that the polymer solution, from which the membrane is created, is of sufficient viscosity. Furthermore, the support material must be of sufficient density and not impaired either by the solvent system or the aqueous washing baths and drying ovens used in the process.

U.S. Pat. No. 4,466,931 assigned to the assignee of the instant invention discloses a method whereby a microporous membrane is prepared by the exposure of ultraviolet radiation or electron beam radiation of a solution of acrylic oligomers and/or monomers in a solvent or mixture of solvents which is a nonsolvent for the polymer formed as a result of the exposure. The class of monomers and oligomers most noted for this characteristic of undergoing rapid polymerization under electron beam or ultraviolet radiation are: the addition of polymerizable unsaturated organic compounds having a double bond between two carbon atoms, at least one of which has also bonded thereto a carboxyl, carboxylate ester or amino functionality; the epoxies and other cyclic ethers; and thiolenes.

When ultraviolet radiation of sufficient intensity in the 200 to 400 nm range is present, and in the presence of photoinitiator molecules which capture ultraviolet light and promote the polymerization reaction, or by the rapid injection of electrons from an electron beam, the process of polymerization and simultaneous phase separation can be made to take place with great rapidity. Consequently, production speeds greater than 100 feet per minute can be achieved. With an appropriate electron beam, line speeds in excess of 300 feet per minute are possible. The crosslinked microporous film produced by either technique must still be washed free of the original solvent, which remains in the pores after polymerization, and subsequently dried.

Due to the very high rate of manufacture compared to conventionally prepared microporous membranes, there is great advantage to the preparation of an ultraviolet or electron beam polymerized membrane as a laminated layer bonded to a fabric or paper support material. However, due to the low viscosity of the solutions normally used (10 to 50 cps), it is very difficult to utilize conventional methods of surface coating. Such techniques will not support the thin liquid layer unless the support material is quite dense.

Additional problems are presented with support materials which do not have a homogeneous superstructure. Defects or openings in the superstructure are nonuniform. Unless the support is extremely dense, such supports are difficult to coat without the formation of defects, such as holes, in the coated layer. In addition, the line speed must be sufficiently fast such that the residence time of the coating solution on the support, until completion of the polymerization, is shorter than the time for it (the solution) to wick into the support matrix.

Another problem relates to the preparation of hydrophobic membranes from ultraviolet or electron beam curable materials. In U.S. Pat. No. 4,466,931, all of the oligomers tested yielded intrinsically hydrophilic membranes. Moreover, conventional post-preparation treatments to render the membrane hydrophobic, such as dipping the membrane in solutions containing silicone or perfluorocarbon additives do not yield satisfactory results. Neither did the addition of vinyl terminated silicones or long chain hydrocarbon acrylate esters to the coating solution.

Additional problems include identification of the specific chemical structure of an oligomer appropriate to utilize for several of the applications of interest, which require flexibility and toughness. At the same time the material must also have sufficient mechanical strength so that the forces due to the large internal surface area do not cause the collapse of the porous structure. Similarly, the washing solvent which is used to wash out the curing solvent must not attack or soften the microporous structure and cause the film to collapse.

SUMMARY OF THE INVENTION

The present invention is a microporous prepared from precursor material which forms a homogeneous solution with a liquid vehicle and is (1) rapidly polymerizable under ultraviolet or electron beam irradiation to the polymerized material, the polymerized material being insoluble and nondispersible in the liquid vehicle, and (2) selected from the group consisting of the organic monomers, organic oligomers, and mixtures thereof which are soluble in the liquid vehicle, the liquid vehicle being inert relative to the material, the precursor material including a hydrophobic monomer. If desired, a support material is laminated directly to the microporous polymerized material.

The instant invention further provides a method for manufacturing a fluid permeable microporous membrane comprising the steps of mixing into a liquid vehicle the microporous polymerizable precursor material, mixing a hydrophobic, monomer with the liquid material into a homogeneous solution, forming the homogeneous solution into a thin liquid layer, and polymerizing monomers and oligomers in the solution. The method also provides for applying a support material into intimate contact with a partially polymerized liquid layer and finally curing the liquid layer to form a laminate with the support material.

BRIEF DESCRIPTION OF THE DRAWINGS

Other advantages of the present invention will be readily appreciated by reference to the following detailed description in connection with accompanying drawings wherein.

DETAILED DESCRIPTION AND PREFERRED EMBODIMENT

Figure 1:
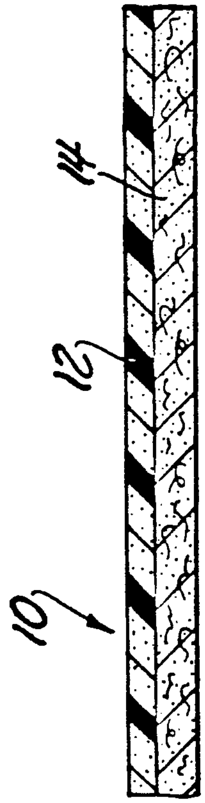
FIG. 1 is a cross sectional vi--w of a membrane constructed in accordance with instant invention.

FIG. 1 shows a membrane laminate 10 constructed in accordance with the present invention. The membrane laminate 10 includes a microporous polymerized material 12 and a support material 14 laminated directly to the microporous material 12.

The microporous polymerized material 12 consists essentially of a precursor material which forms a homogeneous solution with a liquid vehicle and (1) is rapidly polymerizable under ultraviolet or electron beam irradiation to the polymerized material 12, which is insoluble and nondispersible in the liquid vehicle, and (2) is selected from the group consisting of the organic monomers, the organic oligomers, and mixtures thereof which are soluble in the liquid vehicle. The liquid vehicle is chemically inert relative to the precursor material, and a nonsolvent for the polymerized material.

The oligomeric materials which have been found specifically suitable for the subject invention and the intended applications thereof are acrylic polyester urethanes of the general Formula I;

$$R_1—(R_2—R_3)_n—R_2—R_1$$

where $R_1$ is the radical of a hydroxyterminated acrylate monomer such as hydroxyethylacrylate, hydroxypropylacrylate and 4-hydroxybutylacrylate. $R_2$ is the dicarbamate or tricarbamate group resulting from the reaction of the isocyanate materials selected from di- and tri-aliphatic or aromatic isocyanates such as toluenediisocyanate, hydrogenated methylenedianiline diisocyanate, trimethylhexane diisocyanate, methylenedianiline diisocyanate and isophoronediisocyanate. $R_3$ is selected from polyester polyols made of the condensation of adipic acid with each one or of a mixture of ethylene glycol, diethyleneglycol, butanediol, hexanediol and neopentylglycol and which may also contain isophthalic acid and phthalic acid residues to increase rigidity, or some triols such as trimethylolpropane or glycerine to introduce higher functionality. It can also be made of polycaprolactone diol or triols, and $R_3$ can have a number average molecular weight of 200 to 3000 and n may range from 0 to 4.

The above general Formula I describes the situation with difunctional isocyanate and difunctional polyol precursors. It can be modified to Formulas II and III in order to describe the structure of the polyfunctional acrylates which result from using trifunctional polyol and trifunctional isocyanates respectively: that is,

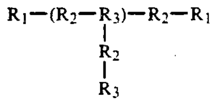 or II.

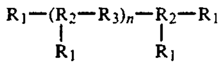 III.

The above described family of oligomer members have been found suitable to span the requirements for either rigid filtration materials or to provide a laminate which is uniquely flexible and provides a rubbery character while being sufficiently strong to provide the properties consistent with the intended nonfiltration, microbial barrier or liquid barrier applications of the subject article.

The oligomeric formulation is preferably in a combination such that the weight percent nitrogen obtained from elemental analysis, and associated with the carbamate functionality, as measured by the Dumas technique is in the range of 1.5±0.3% to 6.2±0.3%. It should be noted that for oligomers in the range between 1.5–4% nitrogen (associated with the isocyanate functionality) the presence of crosslinking agents and/or comonomers will usually be necessary in order to obtain a microporous film.

It is not necessary that the oligomer of the membrane layer 12 be a single oligomer of the above type, but may constitute a mixture or blend of two or more oligomers. In this event, the lower, preferable limit of the average percent nitrogen as carbanate in the mixture or blend will depend on the percent nitrogen (as carbamate) of the component of lower value. For example, a blend of a resin with a percent nitrogen of 1.5% combined with a second resin of 6% may require an average percent nitrogen (on the mixture) of 2.3%, whereas a blend with a resin of 1.7% nitrogen may only require a minimum average (on the mixture) of 2%.

In addition to acrylic polyester urethane oligomer, it is often useful and sometimes necessary to add a cross-linking monomer with the oligomeric precursor material and the liquid vehicle. The cross linking monomer may be chosen from difunctional and trifunctional cross linking monomers for the purpose of adding strength and stabilizing the membrane against collapse. Examples of such materials are 1,4- butanedioldiacrylate (BDDA), 1,6-hexanedioldiacrylate (HDDA), trimethylolpropanetriacrylate (TMPTA), tetraethylene glycol diacrylate (TEGDA), tripropylene glycol diacrylate (TPGDA), neopentyl glycol diacrylare, polyethylene glycol diacrylates, polypropylene glycol diacrylates, 1,3 butylene glycol diacrylate and the diacrylates and triacylates derived from ethoxylated and propoxylated diols and triols which are mentioned in the above di and triacrylates. The membrane 12 may include these materials in order to provide specific desired combinations of mechanical properties, pore size, and void volume. Experimentation has shown that these materials should not constitute more than 50% (wt/wt) of the polymerizable material in the system.

In addition to polyfunctional acrylates, monomers such as acrylic acid, N-vinylpyrrolidone, N-vinylcaprolactam, 2-ethylhexylacrylate, phenoxyethylacrylate, isobornylacrylate, dicyclopentadienyl ethyl acrylate, tetrahydrofurfuryl acrylate, ethyldiglycolacrylate, hydroxyethylacrylate, hydroxypropylacrylate, butylcarbamylethylacrylate and isobutoxymethylacrylamide, can also be added either by themselves or with the crosslinking monomers such that the total content of monomers is in the range of up to 50% of the polymerizable solids content. The function of the monomers is to increase flexibility, modify mechanical properties or to introduce desired chemical groups such as carboxylic or hydroxy groups.

The microporous films previously produced from the combination of oligomer and crosslinking monomer alone are hydrophilic and intrinsically wettable with water. A hydrophobic membrane laminate may be produced by the addition of a hydrophobic monomer to the microporous material. The following have been found to provide the property of hydrophobicity to the microporous film:

(1) 1,1,3, 3-tetramethylbutylacrylamide (t-octylacrylamide or TOCTAM) having the formula

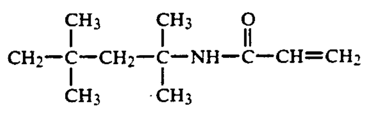

(2) perfluoromonomer of the general structure

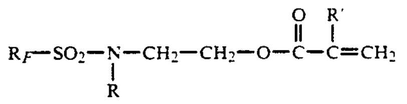

where $R_F$ is the perfluoroalkyl radic $C_kF_{2k-1}$ where k is essentially 6 to 10, R is of the formula $C_mH_{2m+1}$ where m=2–4, and R′ is hydrogen or methyl, (3) perfluoroacrylic monomer of the structure

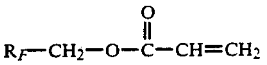

where $R_F=C_zF_{2z+1}$ and z is 6–8.

When utilizing TOCTAM, the hydrophobic monomer would comprise preferably no less than 8% and no more than 30% by weight of the polymerizable material in the formulation. The perfluoromonomers should be present as no less than 3% and no more than 25% (weight/weight) of the total polymerizable components of the solution. This relatively small amount of monomer provides hydrophobic characteristics to the laminate. Alternatively, an independent membrane, not laminated to a support, may be manufactured which includes excellent hydrophobic characteristics. That is, a membrane made from the precursor material of the instant invention, but not laminated to a support material, may be made hydrophobic pursuant to the addition of the aforementioned monomers.

It is believed that the hydrophobic monomer segregates upon polymerization to provide a continuous hydrophobic surface at the interface between the polymerizing material and the remaining solution. The aforementioned results are unexpected for several reasons. First, the hydrophilic nature of the membranes without the monomer is a query because of the relatively hydrophobic character of the organic compounds comprising the monomers or oligomers used as precursors. However, it has been found that such membranes are nonetheless intrinsically wettable. Second, the addition of the small amount of monomer to the precursor solution forms a homogeneous one phase solution. From this homogeneous solution, the hydrophobic monomer somehow segregates itself during polymerization to cause the formation of a hydrophobic surface which possesses hydrophobic barrier properties.

Finally, it is unexpected that tne hydrophobic monomers behave as hydrophobic agents despite their originating in relatively low concentration in a homogeneous solution, as opposed to hydrophobic agents such as dimethyl siloxanes or stearyl compounds which are surface deposited in a post-treatment or the specific grafting of the hydrophobic fluromonomer to the hydrophilic structure in a separate post polymerization treatment. The latter treatments are described in detail in the paper of Heckman and Strickler in Vol. 5 of the Index 84 Congress organized by the European Disposables and Nonwovens Association. With respect to the behavior of the t-octylacrylamide, it seems that the hydrophobic character imparted is related to the compact stereochemical structure of the methyl groups in the t-octyl radical, since lauryl acrylate, which contains a linear hydrocarbon chain with a larger number of carbon atoms (12), does not show the effect. The effect to TOCTAM is unexpected since normally linear parafinic chains exhibit better hydrophobiciry than branched ones and the water repellency characteristic is normally achieved with longer than 8 carbon atoms in the chain, and 14 to 20 carbon atom linear hydrocarbon chains are usually used.

The instant invention provides a hydrophobic material and does not require post treatment. Further, the instant invention provides a hydrophobic microporous membrane which is not contaminated Or obstructed by added silicone or other surface agent.

The liquid vehicle or solvent is preferably chosen from the group having the formula $CH_3(CH_2)_nCOOR'$ where R' equals methyl, ethyl, isopropyl, and n is 6–16 or, $R''OCO(CH_2)_nCOOR''$ where n equals 3 to 8 and R'' is methyl, ethyl, isopropyl, butyl, isobutyl, octyl or isooctyl. Examples are methyl, ethyl or isopropyl esters of capric, caprylic, caproic, lauric, myristic and palmitic acids (namely: linear fatty acids of 6–16 carbon atoms), and dimethyl, diethyl, diisopropyl, diisobutyl, diisooctyl, dibutyl and dioctyl esters of glutaric, adipic, azelaic and sebacic acids.

These esters can be used alone or as mixtures with one another of the above group of esters as well as in combinations with the butyl ether of ethylene glycol acetate, also known as butyl cellosolve acetate, because of their specific solubility compatibility properties toward the Oligomers and monomers, and their general characteristics of having a very low toxicity, volatility and flammability. Depending on the pore size and void volume required for the particular membrane application, the weight percent of total solvent in the solution to be polymerized may range from 40 to 80%. Reducing the weight percent of solvent in the solution, i.e. increasing the weight percent of polymerizable solids, tends to reduce the pore size. Depending on the mechanical strength of the polymerized material, this can sometimes lead to collapse of the microporous matrix due to the very large force generated by the large internal surface area multiplied by the interfacial energy. In such cases a transparent or partially opaque membrane will result.

It has further been determined that the temperature at which the initially transparent solution of the oligomer and monomers first becomes hazy to the eye (the cloud point) is strongly correlated to the largest pore size of the microporous film which results. As the cloud point temperature drops, the pore size becomes smaller. Such behavior is indicative of the fact that the solvent or solvent mixture chosen is a better solvent for the oligomer and not as bad a nonsolvent for the resultant polymer. To obtain membranes with pore sizes in the 0.05 to 0.5 micrometer range, solutions containing 35% polymerizable solids and possessing cloud points between 10° C. and 40° C. are optimal for several of the oligomer systems examined.

The cloud point not only serves as a guide with respect to the pore size to be anticipated in the final microporous membrane, it also serves as a valuable guide with respect to the operating temperature at which the process should be carried out. Since the cloud point represents the first instability and onset of phase separation in the precursor solution, it is preferable to carry out the process at a temperature of at least 2 degrees above the observed cloud point. The major reason for this is that the system is most reproducible under these conditions.

However, this does not mean that the process cannot be operated at temperatures near or even below the cloud point of the solution. Under such conditions it must be kept in mind that some liquid-liquid phase separation may occur and that this will change the distribution of the pore size and the structure of the resultant membrane. Since such situations are by their nature time dependent and difficult to control, it has been found to be advisable to work in the stable, single phase situation which is to be found at least 2 degrees above the cloud point. However, since this temperature depends on specific chemical interactions between the solvent (including any photo initiator and surfactant present) and oligomer, this temperature range is only an approximate guide and cannot be generalized.

While most solutions which are in the homogeneous, stable region are optically clear, &t has sometimes been found that due to the presence of a small quantity of a high molecular weight fraction of an oligomer, an apparently stable solution demonstrates a certain amount of cloudiness or haze. The presence of such a haze does interfere with the determination of the cloud point and for this reason such systems are not preferable. However, the presence of this fraction, as indicated by the haze, does not appear to affect the properties of the final membrane, as we have examined solutions which have been clarified either by filtration or centrifugation from this fraction and the properties of the final membranes produced in either case from the same solution have been almost identical.

Surfactants may be mixed with the oligomer in the liquid vehicle. Surfactants, such as DC-193, a copolymer of polydimethylsiloxane and a polyether (Dow Corning Corp.) may be used to obtain sufficient spreading of the solution on an appropriate paper or moving belt. Surfactants, as well as photoinitiators used for ultraviolet cured materials, may change the cloud point and influence adhesion of the polymerized membrane 12 to a specific support substrate.

Unexpectedly, the instant invention can provide a laminate having strengthened superstructure properties wherein the porosity and transfer characteristics of the laminate are actually better than the free film. The instant invention provides a microporous membrane-support layer laminate without gluing wherein adherence of the membrane 12 to the support material 14 increases mechanical stability.

The support material 14 may be a woven or nonwoven fabric. Excellent adhesion of the microporous membrane 12 to the support material 14 may be achieved by the support material of a polyamide or polyester nonwoven fabric in the range of 0.3 ounces per square yard to 1.5 ounces per square yard. Excellent results have also been obtained where the support material 15 is a polypropylene nonwoven fabric which is corona discharge treated at a minimum of 6.5 watt-hours. Optimum results are obtained for both UV and EB curing by in-line corona discharge. Additionally, a nonwoven cellulosic derivative may also be used. For Example, the microporous member 12 may be laminated to a common paper material.

Figure 2:
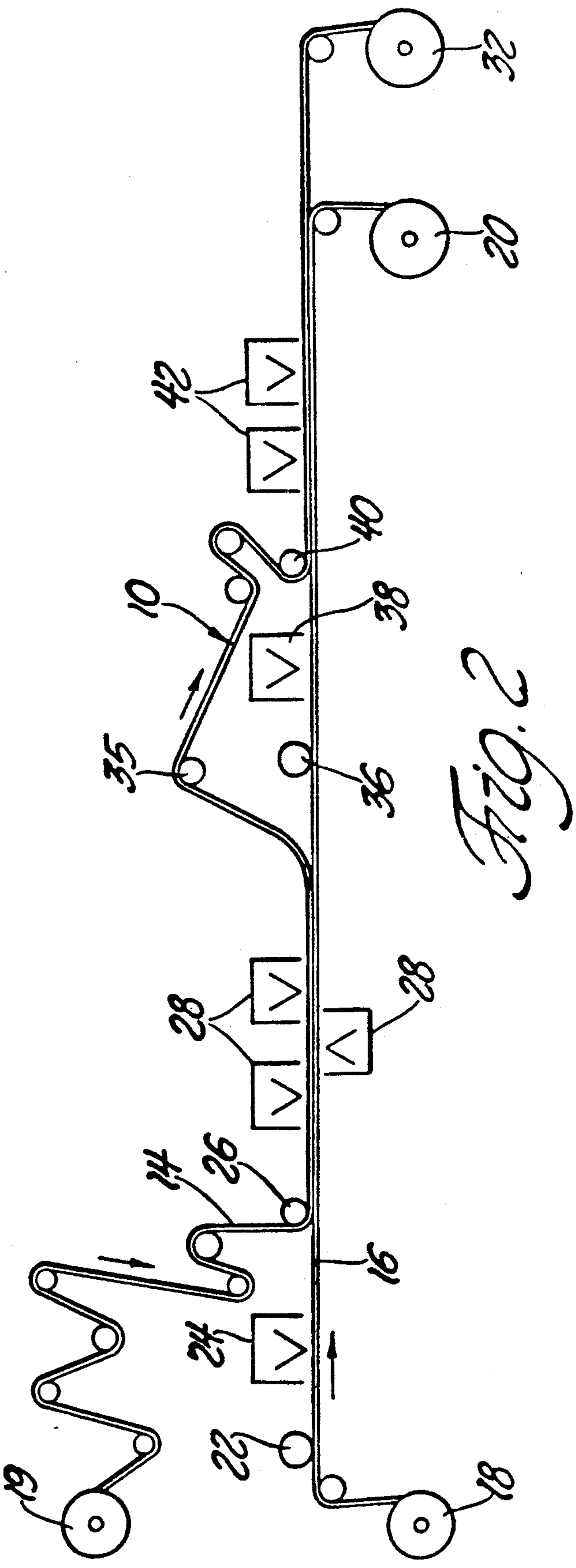
FIG. 2 is schematic depiction &illustrating the subject method.
Figure 3:
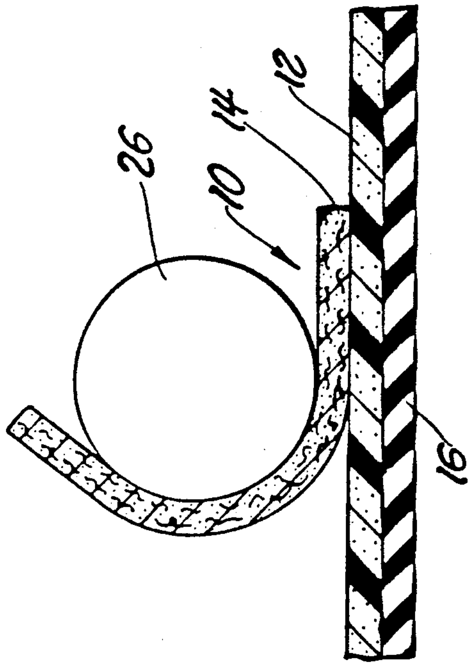
FIG. 3 is a schematic depiction of the subject method.
Figure 4:
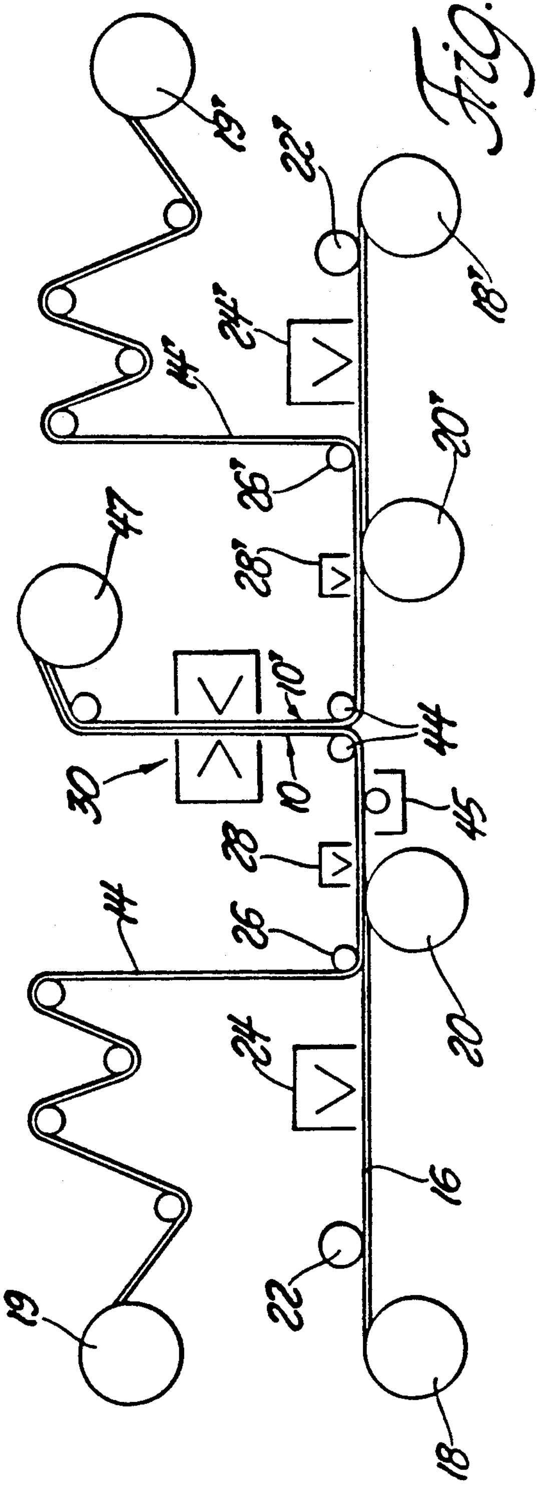
FIG. 4 is a schematic depiction of an alternate method for preparing a second embodiment as shown in FIG. 5.

The instant invention provides a method for manufacturing the fluid permeable microporous member 10. The method essentially includes the steps of mixing into the liquid vehicle the precursor material, forming the composition into a thin liquid layer, applying a support material into intimate contact with the liquid layer, exposing the combination of the liquid layer and support to ultraviolet or electron beam irradiation to finally cure the liquid layer and to form a laminate with the support material. These steps of the method, with the exception of the final wash step, are illustrated in FIGS. 2–4. The step of removing the inert solvent from the roll of laminate at roller 32 in FIG. 2 may be accomplished by the use of any appropriate fabric washing apparatus consisting of baths and/or sprays which do not mechanically crush the microporous structure of the coating. An example of such an apparatus is the Permasol F machine (Jawetex Company, Switzerland).

As shown in FIGS. 2–4, the thin liquid layer may be exposed to electron beam or ultraviolet radiation to partially polymerize the material prior to application of the support material. This step takes place in the presence of atmospheric oxygen. This causes the partial polymerization of the liquid layer and brings it to a point at which it does not easily flow. The optimum extent of polymerization must be determined experimentally for a given composition and web speed; the web speed being the speed of the support on which the liquid is layered. The polymerization level is dictated in part by the electron beam dose rate or the strength of the UV lamps. Since UV lamps are usually not infinitely variable in their output, like electron beam equipment, various filter arrangements may be necessary to control the cure dose rate. The most serious result of overcure is a lack of lamination adhesion while that of under cure is the presence of pinhole defects in the membrane.

Figure 6:
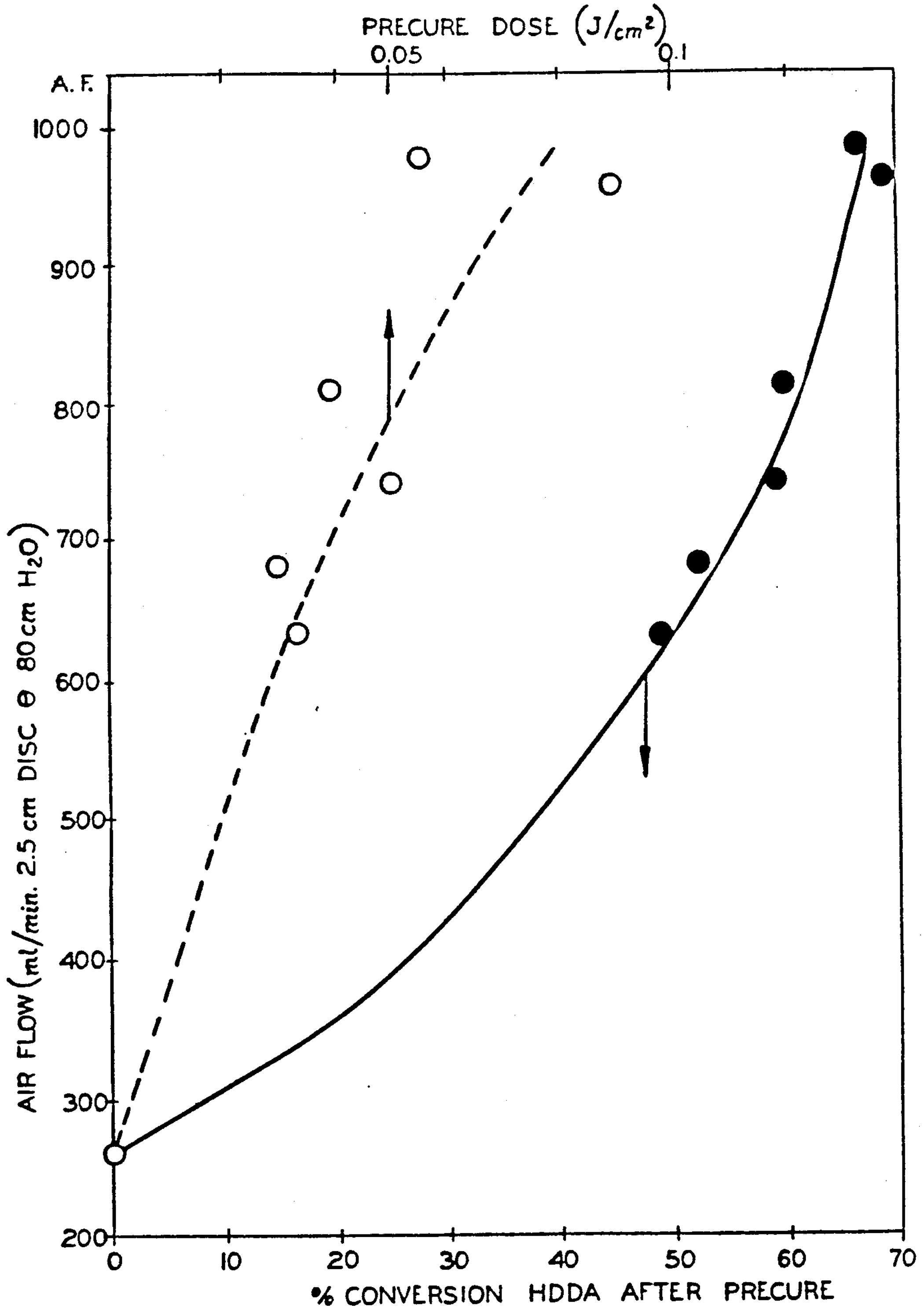
FIG. 6 is a chart illustrating the effect of precure dose on air flow.

Example 3 and FIG. 6 illustrate the effect of precure doses on air flow properties. The effect was also shown in FIG. 6 as the dependency of the air flow of the membrane on the relative conversion of the crosslinking monomer after the stage of precure and prior to the lamination stage. The data for percent conversion of the monomer serves to indicate the relative degree of polymerization. It was determined by analyzing residual nonpolymerized monomer after the precure stage. The different levels of conversion have been achieved by attenuation of the precure dose and relate to the same set of air flow versus precure dose data points. Zero precure irradiation or zero crosslinking still provides a polymer/support combination having transport properties. Such a composite or mechanically reinforced material has maximum fiber reinforcement as the prepolymerized material wicks, or is absorbed into, the interstitial spaces of the support material 14 prior to final irradiation.

It has been determined that the presence of atmospheric oxygen is required in the partial cure step in order to obtain good adhesion in the following step in which the fabric substrate is laminated to the partially polymerized solution. As shown in FIG. 2, the manufacturing system includes a continuous belt 16 driven from roller 18 to roller 20. The mixture of solvent and precursor material are applied to the belt at 22. It is at this point that the composition is formed into a thin liquid layer. The thin liquid layer of the composition is precured by exposure to ultraviolet or electron beam irradiation at 24. The support material 14 is brought into intimate contact with the liquid layer by roller 26, as shown in detail in FIG. 3. The combination is then conveyed under one or more ultraviolet lamps or an electron beam curing head 28 to complete the polymerization of the microporous film 12. The microporous film 12 is now laminated to the support material.

The ultraviolet lamps for carrying out the polymerization may be accomplished through the fabric support 14 as shown in FIG. 2. This is totally unexpected in view of the report of Gray III et al. as recited in the U.S. Pat. No. 4,289,821 wherein it was stated that radiation by ultraviolet light can only penetrate optically clear substances. The curing by ultraviolet light may also be accomplished by irradiation through a moving belt if the material of the belt is made from an optically clear, silicone release treated, polypropylene or mylar film. Hence, it is possible to effect a final cure using ultraviolet light which is directed from above the support 14 or below the belt 16.

Once finally cured, as shown in FIG. 2, it is still possible to either perform an additional coating with the same or a different composition coating solution and of the same or different thicknesses, or to wind up the cured laminate on roller 32. For example, the polymerized laminate 10 is removed from belt 16 over roller 35. A second material formulation of precursor material is applied to belt 16 at 36 and irradiated at 38, the laminate material 10 being added at point 40. The material 10 is then finally cured at station 42 and rolled onto rollers 32 as the belt 16 is rolled onto roller 20.

Figure 5:
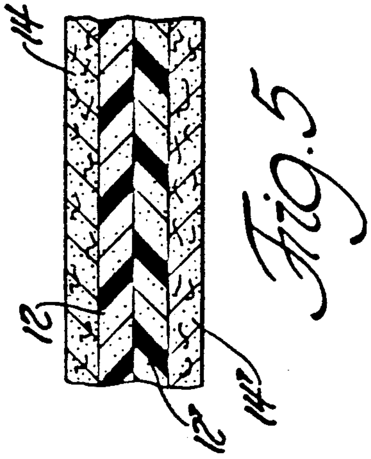
FIG. 5 is a cross sectional view of a second embodiment of the instant invention.

A second alternative is shown in FIG. 4 wherein a first laminate 10 is formed from the left on a first belt 16 and a second laminate 10' is formed on a second belt 16' (like components being numbered and primed) and the two cured membrane surfaces are combined at lamination nip rolls 44 and irradiated at 30, as discussed above, to form a dual layer laminate having a support surface on the outer surface of each laminate. The membrane layers are adhered by the application of a layer of precursor material by kiss roller 45. The product formed is rolled onto roll 47 and illustrated in FIG. 5.

The ability to create multiple microporous layers which become chemically grafted to one another and which can have different physical/chemical properties is one of the major advantages of the instant invention. It is very often the case that formulations which have the best mechanical properties lack adhesion or may also display an unwanted degree of adhesiveness towards a support, which is a phenomenon which is known in the textile industry as "blocking." Thus it is possible to coat an initial layer with one set of properties for adhesion, a middle layer which has the correct bulk mechanical properties which one desires in the coating and even complete this with a specialized top coating if necessary. An obvious byproduct of this technique is also the fact that any macroimperfections in the coating are also covered up by one or another of the layers.

Although the cured laminate still contains the original solvent in its pores, the pore formation process is over the moment the cure is complete and the material has been found to be quite stable in this form. Thus, the still wet roll can be stored for washing at a later time. This feature of the subject invention is a significant advance over the prior art since it does not require the washing process and the curing process to either operate at the same line speed or have multiple roll arrangements which compensate for large differences in the line speed. However, the wind up speed must be maintained so that the tension in the roll is controlled such that the microporous structure is not crushed by the tightness of the wrap. Since this parameter is a function of the specific oligomer and support fabric used, the tension limit must be determined for every given combination.

The washing process is performed in baths containing a solvent which efficiently removes the curing solvent remaining in the pores and which does not attack or soften the crosslinked polymeric film. This is because the internal surface area of the microporous film is very large and if the material has been softened to the point that the force resulting from the interfacial tension multiplied by the internal area is greater than its mechanical strength, the microporous structure will undergo some degree of collapse. Examples of washing solvents are perchloroethylene, methylene chloride and 1,1,2-trifluorotrichloroethane (FREON 113, Dupont) and mixtures of low alcohols, acetone, and chlorinated solvents with FREON 113. For the family of acrylic urethane polyester oligomeric materials specifically well suited for the instant invention, FREON 113 has been found to be the most appropriate due to its insolubility in the polymerized polymer. Perchloroethylene or other chlorinated solvents together or alone may cause collapse of the porous structure. Moreover, the FREON 113 has a very low toxicity, is not flammable or explosive, and requires very low energy to remove it in the drying step. An additional advantage is that is has a high extraction coefficient towards residual monomer, oligomer and, in the case of ultraviolet curing, photoinitiator. The resulting membrane material is sufficiently clean and free of potential contaminates to pass U.S.P. class VI testing of plastic materials for medical devices.

The laminates of the instant invention include properties, as illustrated in the following examples, which make the laminate an excellent substrate for use as breathable, sterile barriers. Such breathable, sterile barriers may be utilized for purposes associated with medical, disposable nonwoven fabrics. Additionally, they can serve as hydrophobic, breathable barriers, specifically as the external layer of a diaper, feminine hygiene product and the like.

EXAMPLES

A. Definitions and Terms:

Air flow: expressed in ml/min $cm^2$ at a pressure differential of 80cm height of water. [on a 5 square disc of the laminate]

WWR: wire wound rod used to lay down the coating. The rod number times a factor of 1.9 gives the approximate wet thickness in microns.

Washing and drying: is the process of thorough washing of the porous product in 1,1,2-trifluorotrichloroethane also known as FREON 113 or FREON, and subsequent drying at room temperature.

Light dose or Radiation dose: expresses the effective UV energy to which the coating is exposed. The numbers in joule/$cm^2$ are taken from the reading of the International Light Radiometer, Model IL745 with Light Bug A309, which has its maximum response at about 350nm.

Energy flux or Radiation flux: expresses the effective near UV energy output of one cm length of the lamp after said attenuation.

Bubble Point(BP): is the pressure of air required to displace, from the largest pores in the membrane, a liquid which wets the porous structure completely. In the following examples the BP test is done with kerosene as the liquid. The bubble point is inversely proportional to the pore size, and a Kerosene BP of 1 bar is approximately correlated with a pore size of 0.4 microns.

Water breakthrough (WBT): The pressure under which the first sign of water penetration through the porous laminate appears. The method used in the following examples uses a rate of pressure rise of 1 $kg/cm^2$ min.

Cloud Point (CP): The temperature at which the homogeneous clear solution changes to hazy or cloudy solution upon cooling. The cloudy state indicates a phase separation process.

Tables 1 through 3 list the materials referred to in the Examples.

TABLE 1

ACRYLATED URETHANE OLIGOMERS

| RESIN | Mn(1) | Functionality | % N (2) | $R_1$(3) | $R_2$(4) | $R_3$(5) |
|---|---|---|---|---|---|---|
| A | 3500-4500 | 2 | 1.58 | HPA | TDI | EG-ADA |
| B | 3000-3500 | 2 | 1.71 | HPA | IPDI | EG-ADA |
| C | 1200(6) | 3 | — | HEA | (6) | PCL |
| D | 2000 | 2 | 3.78 | HEA | IPDI | BD-ADA |
| E | 1200-1400 | 2 | 4.16 | HEA | HMDI | EG-ADA |
| F | 1200-1400 | 2 | 4.35 | HEA | IPDI | EG-ADA |
| G | 1200-1400 | 2 | 4.50 | HEA | IPDI | PCL |
| I | 1700-2000 | 2 | 5.03 | HEA | IPDI | BD-ADA |
| J | 442 | 2 | 6.16 | HEA | TMDI | — |
| K | 1500 | 2 | 4.8 | HEA | TDI | PPG |
| L | 1500 | 2 | 4.36 | HEA | IPDI | PPG |
| M | 1200 | 2 | 4.67 | HEA | IPDI | DEG-ADA |

Footnotes for Table 1:
(1)Mn is the number average molecular weight based on the stoichiometry of the building blocks, $R_1$, $R_2$ and $R_3$.
(2)% N based on elemental microanalysis.
(3)HEA is 2-hydroxylethylacrylate. HPA is 2-hydroxy propyl acrylate.
(4)IPDI is 3-isocyanatomethyl-3,5,5-trimethylcyclohexyl-isocyanate, also known as isophorone diisocyanate. TDI is mixed isomers of toluenediisocyanate. HMDI is methylene bis (4-cyclohexylisocyanate) also known as hydrogenated methylenedianiline diisocyanate. TMDI is mixed isomers of trimethylhexamethylene diisocyanate.
(5)EG-ADA is the repeat unit of the polyester polyol based on the condensation product of ethylene glycol and adipic acid. DEG-ADA is the repeat unit of diethyleneglycol and adipic acid. BD-ADA is the repeat unit of polyester polyol based on the condensation product of 1.4 butanediol and adipic acid. PCL is the repeat unit of polycaprolactone diol. PPG is the repeat unit of Polypropyleneglycol.
(6)Commercial resin made by H. Rahn, Zurich from a proprietary aliphatic trifunctional isocyanate.

TABLE 2

List of Materials and Abbreviations Used in the Examples

| | |
|---|---|
| | Reactive Diluents |
| BDDA | 1.4 butanediol diacrylate |
| HDDA | 1.6 Hexanediol diacrylate |
| TPGDA | tripropylene glycol diacrylate |
| TMPTA | trimethylolpropane triacrylate |
| PEA | phenoxyethylacrylate |
| BCEA | butylcarbamylethylacrylate (adduct of butyl isocyanate and hydroxyethylacrylate) |
| AA | Acrylic acid |
| | Hydrophobic Monomers |
| FX-13 | 2-(N-ethylperfluoro octane sulfoamido) ethylacrylate, a product of 3M Corp. |
| FX-14 | Essentially 2-(N-ethylperfluoro octane sulfonamido) ethyl methacrylate. A product of 3M Corp. |
| FX-189 | Essentially 2-(N-butylperfluoro octane sulfonamido) ethylacrylate. A product of 3M Corp. |
| FC-5165 | 1,1-dihydro perfluoro octylacrylate $CF_3(CF_2)_6CH_2OCOCH{=}CH_2$ |
| TOCTAM | N-1,1,3,3, tetramethylbutylacrylamide, (Tertiary octylacrylamide). A product of National Starch and Chemical Corp. |

TABLE 2-continued

| List of Materials and Abbreviations Used in the Examples | |
|---|---|
| **Solvents** | |
| M810 | Commercial mixture containing approximately 55% methyl caprylate, 40% methyl caprate, 3% methyl caproate and 2% methyl laurate. |
| BCA | butyl cellosolve acetate (butyl glycol acetate) |
| M12 | methyl laurate |
| DIBA | diisobutyladipate |
| DIOA | diisooctyladipate |
| DBE-5 | Commercial solvent by DuPont containing dimethylglutarate as the main constituent. |
| **Miscellaneous Components** | |
| Irgacure 651 | benzil dimethyl ketal. A photoinitiator made by Ciba Geigy. |
| DC193 | silicone surfactant. A product of Dow Corning. |
| L540 | silicone surfactant. A product of Union Carbide Corp. |
| FC430 | coating additive. A product of 3M Corp. |
| Irgacure 184 | 1-hydroxycyclohexylphenylketone. A product of Ciba Geigy. |
| Darocur 1116 | 1-(4-isopropylphenyl)-2-hydroxy-2-methylpropan-1-one. |

TABLE 3

List of Nonwoven Supports Used in The Examples

| BRAND NAME | PRODUCER TYPE | weight ($g/m^2$) | weight (oz./sq.yd) |
|---|---|---|---|
| CEREX 0.3 | Monsanto polyamide spunbonded | 10 | 0.3 |
| CEREX 0.4 | Monsanto polyamide spunbonded | 14 | 0.4 |
| CEREX 0.5 | Monsanto polyamide spunbonded | 17 | 0.5 |
| CEREX 0.6 | Monsanto polyamide spunbonded | 20 | 0.6 |
| CEREX 0.85 | Monsanto polyamide spunbonded | 29 | 0.85 |
| Hollytex 3254 | Eaton-Dikeman polyester spunbonded | 63 | — |
| Hollytex 3251 | Eaton-Dikeman polyester spunbonded | 17 | 0.5 |
| Hollytex 3256 | Eaton-Dikeman polyester spunbonded | 25 | 0.75 |
| Paper | Hogla paper, Industrial wiping grade | 24 | — |
| 0.8 oz. | 0.8 oz./sq.yd. spunbonded polypropylene | 27 | 0.8 |

EXAMPLE 1

A solution was made from 40 parts of a mixture of Resin F/HDDA/FX-13 at a ratio of 80/20/10 by weight, 53 parts M810, 7 parts BCA, 2 parts Irgacure 651 photoinitiator and 0.25 parts DC193 surfactant by mixing at 60° C.

The solution was coated on release paper with a wire wound rod (R.D. Specialities Rod #70) giving a wet film thickness of 130 microns. The coated paper was passed on a carrier belt at 10.5 meters/min. under a single 200 watt/inch Hanovia medium pressure mercury lamp equipped with an elliptical reflector. The reflector was situated at a distance of 100mm above the plane of the carrier belt. The lamp intensity was attenuated by means of a neutral density filter in such a manner that it produced a flux of effective UV radiation of 1.18 watt/cm as measured by an International Light IL745 Radiometer with an A309 Light Bug which has a maximum sensitivity of 350nm. The precured coating was covered with a sheet of 0.3 oz/sq. yd. Cerex. The laminate was gently pressed with a roller and passed twice more through the same UV oven but without the metal screen so that the energy flux at each pass was 4.5 watt/cm. The laminate was removed from the release paper, washed thoroughly in a series of 4 baths with FREON 113 and then dried out at room temperature. The air flow and bubble point of the laminate were measured. The film was stripped off of the support and tested again. The void volume of the free film was also measured by weighing the free film before and after immersion in kerosene. The void volume was calculated from the known weights of the polymer and the kerosene and their known densities (1.2 and 0.79 respectively). The results of these tests appear in Table 4.

TABLE 4

| Example # | Thickness of the unsupported film (microns) | Void vol. (%) | Air flow (ml/min*) | Bubble point kerosene (atm) |
|---|---|---|---|---|
| 1 (Laminate) | — | | 841 | 1.65 |
| 1 (Stripped off film) | 104 | 64.4 | 808 | 1.60 |
| 2 (Unsupported) | 104 | 57.9 | 448 | 1.60 |

*Air flow is expressed in ml/min for a 2.5 cm disc under a pressure differential of 80 cm of water.

EXAMPLE 2

The same solution as in Example 1 was coated and cured through the same schedule of steps except that no support was laminated to the membrane. The unsupported film was tested as in Example 1 and the results are given in Table 4.

The unsupported film has lower void volume due to a higher degree of shrinkage which is a result of the absence of a support. The drop in air flow follows this change in void volume.

EXAMPLE 3

A solution composed of:

35 parts mixture of Resin F/HDDA 80/20 by weight
56 parts M810
9 parts BCA
2 parts Irgacure 651
0.5 parts DC193 was prepared as in Example 1. A series of coatings were made on release paper with WWR#40 (wet thickness 75 microns) and subjected to different levels of exposure. The various samples were then laminated to Hollytex 3254 and postcured twice as in Example 1. In the extreme case the light dose was zero. That is, no pre-exposure was made prior to lamination. On the other extreme a light dose of 2.0 watt/cm was applied prior to lamination and postcure. Samples of the precured layer were analyzed by gas chromatographic technique and the residual HDDA monomer was detected. FIG. 6 shows the air flow properties of the membranes, after washing with FREON 113, as a function of the percent of the polymerized HDDA and as a function of the light dose ($Joule/cm^2$). Higher air flow characterized the higher precured samples. All precured samples exhibited higher in flow than that in which direct transfer coating (zero precure dose) was applied.

EXAMPLE 4

40 grams of solution containing 90 parts resin D, 10 parts N-Vinylpyrrolidone, 25 parts HDDA and 12.5 parts FX-13 was dissolved in a mixture of 57 grams M810 and 8 grams BCA. 2 grams Irgacure 651 and 0.25 grams DC193 were added. The final solution had a cloud point of about 20° C. It was coated with WWR#40 (75 micron wet thickness) on release paper and passed at 10 m/min under a UV lamp with metal screen attenuator such that the light flux was a 1.18 watt/cm. A sheet of Hollytex 3254 nonwoven was laid and pressed gently over the precured film and the laminate was subjected to two more passes at 10 m/min under the non-attenuated light source. The film was washed with FREON 113 and dried as in Example 1. It had an air flow of 943 ml/min at 80cm $H_2O$ pressure on 2.5 diameter membrane disc. Its bubble point in kerosene was 1.58 bar and it had a WBT of 3.5kg/cm$^2$.

EXAMPLE 4A 35 parts of resin D/HDDA/AA at a ratio of 81/9/10, 45.5 parts M810, 19.5 parts M12, 2 parts Irgacure 651 and 1 part DC193 were mixed. The solution had a cloud point of 21.5° C. It was coated with rod #50 (95 microns) on release paper and precured at 10 m/min with a fully powered lamp (4.5 watt/cm effective radiation flux). A sheet of Cerex 0.85 was laid and pressed gently onto it. The laminate was postcured twice more under the above radiation conditions. The washed and dried sample had an air flow of 1670 ml/min and a bubble point of 2.6 bar. The membrane was instantaneously wettable by water and had excellent wicking by water.

EXAMPLE 5

Thirty five (35) parts of a solution of Resin B (1.71%N) and HDDA in a ratio of 70/30 was mixed with 25.8 parts BCA and 39.2 parts M810. 2 parts Irgacure 651 and 0.5 parts L-540 surfactant were added. The cloud point of the solution was about 25° C. The solution was coated with WWR#60 (wet thickness of 115 microns) on a release paper and cured at 10 m/min with a light intensity of 4.5 watt/cm, laminated to Cerex 0.5 oz/sq. yd. and postcured twice at 10 m/min with a full powered lamp (4.5 watt/cm). The film was washed and dried as in Example 1. The resulting film was transparent and nonporous as detected by air flow measurements.

EXAMPLE 6

A solution of Resin B (1.71%N) and Resin J (6.16%N) in a ratio of 65.45/4.55 having an average %N=2.0 was mixed with HDDA at a ratio of 70/30. 35 parts of the above mixture were mixed with 18.8 parts BCA and 46.2 parts M810. Photoinitiator and surfactant were added as in Example 5. The cloud point of the solution was 25° C. The curing was done under similar conditions to those in Example 5. The washed and dried film (as in Example 1) was opaque white with an air flow of 1420 ml/min and BP of 0.83 bar.

EXAMPLE 6B 40 parts of the same composition of resins and HDDA as in Example 6, and the same photoinitiator and surfactants were mixed with 60 parts of M810/BCA such that a cloud point of 25° C. was achieved, and were cured under the same conditions as in Example 6. It produced a transparent, nonporous film after washing and drying as in Example 1.

EXAMPLE 7

35 parts of a solution of Resin B and HDDA in a ratio 50/50 was mixed with 16.1 parts BCA and 43.9 parts M810. 2 parts Irgacure 651 and 0.5 parts L-540 surfactant were mixed in at 60° C. The solution had a cloud point of 24.6° C. It was coated as detailed in Example 1 with WWR#50 (95 micron wet thickness) at a speed of 2 m/min. The precure light intensity was set at 3 watt/cm by switching the lamp to half power. The precured coating was laminated to Hollytex 3254 and postcured at 2 m/min at full lamp intensity (4.5 watt/cm). The film was washed and dried as in Example 1. It had an air flow of 1400 ml/min and kerosene bubble point at 1.3 bar.

EXAMPLE 8

35 parts of a solution of resin B, BCEA and HDDA in a ratio of 61.4/8.6/30 was mixed with 16.7 parts BCA and 47.3 parts M810. 2 parts Irgacure 651 and 0.5 parts L-540 was added. The solution had a cloud point of 25° . It was coated with WWR#50 (wet thickness of 95 microns) precured at 10 m/min with 4.5 watt/cm UV lamp, laminated to Hollytex 3254 and postcured twice more under the same conditions. The film was washed and dried as in Example 1 and had an air flow of 1150 ml/min and kerosene bubble point of 0.8 bar.

EXAMPLE 9

A mixture of 59 parts resin A (1.58%N) and 11 parts resin J (6.15%N) having an average %N=2.3 was mixed with 30 parts HDDA. 35 parts of that mixture was mixed with 31.5 parts BCA and 33.5 parts M810. 2 parts Irgacure 651 and 0.5 pph L-540 were mixed in. Cloud point temperature was 25.5° C. The membrane was produced as in Example 6. The resulting laminate had an air flow of 1578 ml/min and a bubble point of 0.9 bar.

EXAMPLE 9B

A similar composition to Example 9 but with average % N of 2.0% produced under similar conditions a transparent nonporous film.

EXAMPLE 10

The same composition as in Example 9, but with a ratio of BCA/M810 32.7/32.3 and a cloud point of 19.8° C. gave a white film with an air flow of 168 ml/min and a bubble point of 1.35 bar.

EXAMPLE 10B

A solution was made of 35 parts resin J (6.16%N), 19.4 parts isopropylmyristate, 45.6 parts methyl laurate, 2 parts Irgacure 651, 0.4 parts DC193 and 0.1 parts L-540. It had a cloud point of 18.3° C. The solution was coated at 95 microns wet thickness on a release paper and precured at 7 m/min with half powered lamp attenuated with a metal screen and a tempered glass (radiation flux of 0.26 watt/cm) and laminated to a Cerex 0.5 oz./sq.yd. and postcured twice at above speed with full powered lamp.

The membrane, after washing and drying as in Example 1, gave a rather rigid coating with air flow of 530 ml/min and bubble point at 3.67 bar.

Table 5 refers to Examples 11 through 32.

TABLE 5

| Ex # | Support | Wet Film Thickness (microns) | Curing Speed (m/min) | Precure Dose ($J/cm^2$) | Air Flow (ml/min. 5 $cm^2$ disc @80 cm $H_2O$) | Kerosene Bubble Point (bar) | Water Break Thru ($kg/cm_2$) | Extensi- bility* (%) | Adhesion (Tape peel test) |
|---|---|---|---|---|---|---|---|---|---|
| 11 | Cerex 0.5 | 95 | 5 | 0.54 | 900-1700 | 1.42 | 3 | 34.7 | good |
| 12 | Cerex 0.5 | 95 | 14 | 0.13 | 1960 | — | — | 27.5 | fair |
| 13 | Cerex 0.5 | 100 | 30 | 0.25 | 1476 | 1.97 | 3 | 22.8 | fair |
| | | | | MRAD | | | | | |
| 14 | Paper | 75 | 10 | 0.07 | 620 | 1.6 | 3.5 | — | good |
| 15 | Woven nylon | 100 | 7 | 0.026 | 254 | — | 3.5 | — | fair |
| 16 | 0.8 oz. polypropylene | 130 | 7 | 0.028 | 1260 | 0 | 2 | poor | good |
| 17 | 0.8 oz polypropylene | 130 | 7 | 0.08 | 200 | 2.35 | Adhesion failure | | poor |
| 18 | 0.8 .oz polypropylene | 45/45 | 7 | 0.028/ 0.062 | 1760 | .68 | 0.8 | — | good |
| 19 | 0.8 oz. polypropylene | 45/45 | 7 | 0.027/ 0.062 | 620 | 1.27 | 1.49 | good | good |
| 20 | Cerex 0.6 | 100 | 10 | 0.20 | 660 | 2.2 | 4.5 | excellent | good |
| 21 | Cerex 0.6 | 55/35 | 7 | 0.20 | 835 | 2.13 | 2.3 | excellent | good |
| 22 | Cerex 0.6/ Cerex 0.3 | 100 | 10 | 0.20 | 766 | 2.65 | 2.5 | good | good |
| 23 | Cerex 0.4/0.4 | 55/55 | 10 | 0.07 | 1020 | 1.25 | | excellent | good |
| 24 | Cerex 0.3 | 55/55 | 5/10 | 0.54 | 2080 | 0.75 | | excellent | good |
| 25 | Cerex 0.5 | 100 | 10 | 0.27 | 1670 | 1.2 | 3.0 | good | good |
| 26 | Cerex 0.5 | 100 | 10 | 0.27 | 1876 | 2.1 | 3.5 | good | fair |
| 27 | Hollytex 3254 | 95 | 10 | 0.18 | 440 | 4.35 | — | brittle | good |
| 28 | Cerex 0.85 | 100 | 10 | 0.27 | 660 | 3.95 | — | brittle | good |
| 29 | Hollytex 3256 | 95 | 10 | 0.07 | 990 | 2.79 | 1.75 | excellent | fair |
| 30 | Hollytex 3256 | 95 | 10 | 0.18 | 1140 | 2.51 | 1.75 | good | good |
| 31 | Hollytex 3256 | 95 | 10 | 0.07 | 100 | 7.0 | 5.5 | excellent | good |
| 32 | Hollytex 3256 | 95 | 10 | 0.18 | 780 | 3.13 | 3.0 | good | fair |

*% extension to the appearance of first hole in the membrane

EXAMPLE 11

A solution containing 35 parts of a mixture of Resin D/HDDA/FX-13 in a ratio of 72/28/10 was mixed with 65 parts M810, 2 parts Irgacure 651 and 0.5 parts DC193. The solution was coated to 95 microns wet thickness with WWR#50 and cured in air at 5 m/min with full lamp intensity such that a light dose of 0.54 joule/$cm^2$ was received. The cured coating was laminated to Cerex 0.5 oz./sq.yd. and postcured twice under the same conditions. The film, after being washed and dried, showed good adhesion between the porous membrane and the fabric.

EXAMPLE 12

An experiment similar to Example 11 was done with the main difference being that the precure stage was done under a nitrogen atmosphere. The light intensity was reduced by increasing the speed to 14 m/min and decreasing the lamp power to 1/2 intensity such that the total light dose was 0.13 joule/$cm^2$. The degree of curing as judged by the mechanical integrity of the precured film and its opaqueness was 7 on a scale of zero to 10 and considerably lower than the grade of 9 given to the precured stage of the film of Example 11. The adhesion to the Cerex substrate was nevertheless much poorer.

SEM pictures show that the air cured sample of Example 11 has semi-fused sticky layer at the polymer/air interface. This layer wets out the fiber and adheres to it. No such layer was found to exist in the nitrogen cured samples of Example 12.

EXAMPLE 13

A solution containing 35 parts of a mixture of Resin D/HDDA/FX-13 in a ratio of 72/28/10 by weight, 64 parts M810, one part BCA and 0.5 parts DC193 was coated with WWR#55 giving wet thickness of 100 microns on a release paper. The coating was passed through an electron beam source (Charmilles-ESI, Electro Curtain type) operated at 170 kilovolts under an inert nitrogen atmosphere at 30 m/min so that it was exposed to 0.25 MRAD. The resulting tacky film was laminated to Cerex 0.5 oz./sq.yd. and postcured with a dose of 3 MRAD. The laminate was washed in FREON and dried. Its properties are given in Table 5.

EXAMPLE 13A

A solution made of 35 parts of a mixture of resin D/HDDA/FX-13 in a ratio of 72/28/10 was mixed with 61.4 parts M810, 3.6 parts BCA and 0.5 parts L-540 and had a cloud point of 20° C. The solution was coated on a release paper and precured on an "Electro Curtain") pilot coating line of Energy Sciences Inc. (Woburn, Mass.) using 0.5 MRAD electron beam dose under ambient atmosphere at 40 ft/min. The precured coating was then laminated to 0.8 oz., spunbonded polypropylene nonwoven which was previously corona treated with 6.5 watts/min. per foot and also electron beam treated in air with 5 MRAD. The laminated structure was then passed again through a 4 MRAD electron beam radiation under nitrogen at 20 ft/min. and separated from the release paper. After being washed and dried, the product showed good adhesion of the coating to the support.

EXAMPLE 13B

The same experiment done with precuring under inert nitrogen atmosphere produced a coating that could not be transferred onto the support for lack of adhesion.

EXAMPLE 14

A solution containing 35 parts of a mixture of Resin D/HDDA/FX-13 72/28/10 by weight, 63 parts M810, 2 parts BCA, 2 parts Irgacure 651 and 0.5 parts DC193 was coated on a release paper to a thickness of 75 microns, passed at 10 m/min under a partially screened UV lamp with a radiation flux of 1.18 watt/cm. The partially cured film was laminated to an industrial wiping paper (made by Hogla, Israel) and postcured twice under a full intensity lamp. The laminate was washed in FREON 113 and dried out. The resultant laminate is an opaque white smoothly coated paper with very good flexibility and good hand feel. Its properties are given in Table 5.

EXAMPLE 15

A solution containing 35 Parts of Resin D/HDDA/FX-13 at a ratio of 81/19/10 by weight, 58.9 parts M810, 6.1 parts BCA, 2 parts Irgacure 651 and 0.5 parts L-540 had a cloud point of 19.2° C. The solution was coated on a continuous line equipped with one 200 W/IN lamp for the precure stage and two 200 W/IN lamps for the final cure. The lamination of the fabric to the precured coating was done between the first two lamps. Separation of the coated fabric from the release paper was done on two separate rewind stations at the exit from the third lamp. FREON washing of the coated fabric was then proceeded on a separate multistep washing machine operated at 2 meters per minute.

The solution was coated on the release paper by means of WWR#55 so the 100 microns of wet thick film was laid down and cured at 7 m/min. The precure intensity was attenuated using a half power lamp with a metal screen and 5mm tempered glass so that a total energy flux of 0.30 watt/cm was used. The precured solution was laminated to a woven nylon fabric which had a light transmittance of 2% in the sensitivity region of the International Light's Light Bug indicator (350nm). Postcuring was done with two fully powered lamps. The resulting washed fabric had an opaque white coating on one side and its original deep violet color on the other side. The coated fabric had good flexibility and feel. Its properties are given in Table 5.

EXAMPLE 16

A solution made of 35 parts mixture of Resin D/HDDA/FX-13 at a ratio of 72/28/10, 62 parts M810, 3 parts BCA, 2 parts Irgacure 651 and 0.5 parts L-540 had a cloud point of 19.3° C. The solution was applied on a release paper with WWR#70 giving a wet thickness of 130 microns. It was precured at 7 m/min with a radiation flux of 0.33 watt/cm achieved by metal screen and tempered glass filers. The precured coating was laminated to a 0.8 oz. spunbonded polypropylene nonwoven which was freshly treated with a corona discharge of 2.5 joule/$cm^2$ prior to the lamination. The laminate was postcured twice at the same speed through a full intensity lamp. The laminate was washed in FREON 113 and dried out. It had good adhesion between the coating and the fabric but a high tendency to crack parallel to the machine direction of the fabric. The laminate had good air flow (Table 5) but zero bubble point due to defects.

EXAMPLE 17

An experiment similar to that of Example 16, but with a formulation identical to that used in Example 15, gave very poor adhesion of the membrane to the support. The membrane, which was practically unsupported, gave a low air flow (Table 5), but a good bubble point and had good mechanical strength including the cross machine direction.

EXAMPLE 18

A solution made of 35 parts mixture of Resin D/HDDA/FX-13 at a ratio of 72/28/10, 38.6 parts methyl laurate, 26.4 parts BCA, 2 parts Irgacure 651, 0.4 parts DC193 and 0.1 parts L-540 had a cloud point of 22.3° C. The solution was coated on the coating line which is described in Example 15. A 75 micron thick wet film was applied on a release paper and passed at 7 m/min through a first lamp attenuated with screens to produce a light flux of 0.32 watt/cm and laminated to a 0.8 oz./sq.yd. spunbonded polypropylene nonwoven which was treated on-line with a 25 watt/cm corona discharge to promote adhesion. The laminate was continuously pulled through two fully powered lamps and separated from the release paper.

A second coating of the same thickness and composition was applied on a release paper and precured as before except that an attenuated light intensity of 0.72 watt/cm was used. The coated side of the above laminate was laminated to this second layer such that a double coating porous film was attached to the fabric. This composite structure was postcured as before, separated from the release paper, washed in FREON 113 and dried out. In this example the first coating, which was only slightly precured, penetrated within the fiber structure of the fabric and produced good anchoring to it. This coating, which was still very defective, was then laminated to a better precured layer that covered the whole structure with a nondefective layer. The composite structure had fair strength in the so-called machine direction of the fabric but the membrane had a high tendency to crack upon slight cross-web extension. The other properties are given in Table 5.

EXAMPLE 19

The same experiment as in Example 18 was done except that the second coating had a composition of 35 parts Resin D/HDDA/FX-13 at a ratio of 81/19/10, 37.2 parts methyl laurate, 27.8 parts BCA, 2 parts Irgacure 651, 0.4 parts DC193 and 0.1 parts L-540. It had a cloud point of 22.6° C. The resulting membrane had better resistance to cross machine deformations and less defects than samples of Example 18.

EXAMPLE 20

A solution containing 37.5 parts of a mixture of 76.5/23.5/8.5 of Resin D/HDDA/FX-13, 59 parts M810, 3.5 parts BCA, 2 parts Irgacure 651 and 0.5 parts L-540 had a cloud point of 16.3° C. The solution was applied with WWR#55 (wet thickness of 100 micron) on a release paper and cured on the continuous line of Example 15 with precure intensity of 3.36 watt/cm (half intensity lamp, no filters) at a speed of 10 m/min. The coated paper was laminated on 0.6 oz. Cerex, postcured and processed as in Example 15. Th resulting membrane had excellent mechanical properties. No defect in the coating had been noticed by pulling the fabric to its break point. However, the coating suffered from partial blocking which caused partial delamination in certain spots.

EXAMPLE 21

A similar solution to that of Example 20, but with 61.5/1.0 ratio of M810 /BCA and surfactants 0.4/0.1 parts DC 193/L-540 so that the cloud Point was 16°, was coated with WWR#30 (55 microns) and processed as in Example 20. A second coating made of 30 parts of a mixture of resin D/HDDA/FX-13 at a ratio of 63/37/10 with 68.7/1.3 parts M810/BCA, 2 parts Irgacure 651, 0.4 parts DC193, 0.1 parts L-540 and having a cloud point of 21.6° C. was applied with a WWR#18 (35 Microns) on a release paper and laminated to the coated fabric under the same precure conditions as in the first coating and with a similar procedure as in Example 18. The resulting washed and dried film had similarly good mechanical behavior as the single coating of Example 20, but had no defects due to blocking.

EXAMPLE 22

The membrane side of a sample of Example 20 was thinly sprayed with a solution of a commercial rubber cement in petroleum distillate and immediately laminated to another layer of a thin 0.3 oz/sq.yd. Cerex by means of a squeeze roll. The three ply laminate had excellent surface texture and scratch resistance. The sample retained the typical characteristics of the breathable laminate (See Table 5).

EXAMPLE 23

A solution made of 35 parts Resin D/HDDA/FX-13 in a ratio of 72/28/10, 64 parts M810, one part BCA, 2 parts Irgacure 651 and 0.5 parts L-540 had a cloud point of 20.7° C. The solution was coated with WWR#30, wet thickness of 55 microns, precured at 10 m/min with a radiation flux of 1.18 watt/cm and laminated to 0.4 oz./sq.yd. Cerex and postcured once with a full powered lamp at 10 m/min. Two such laminates with the membrane face to face were pressed together with a roller and postcured twice more under the same conditions. The resultant laminate after being washed and dried showed good adhesion between the layers and excellent surface texture and scratch resistance, yet, it kept the good flow properties of similar nonsandwiched coatings.

EXAMPLE 24

This example has the same composition and the same thickness as in Example 23 and was precured at 5 m/min with 4.5 watt/cm radiation flux and laminated to 0.3 oz./sq.yd. Cerex. The membrane side of the laminate was recoated with 20% solids solution containing 20 parts Resin D/HDDA/FX-13 in a ratio of 72/28/10, 72 parts M810, 8 parts BCA, 2 parts Irgacure 651 and 0.5 parts L-540. The solution has a cloud point of 23° C. The coating was applied with WWR#30. It was covered with another sheet of Cerex of the same weight and cured twice at 10 m/min with a full intensity lamp. The washed and dried laminate had good uniformity and adhered well to both substances.

EXAMPLE 26

A solution was made with 35 parts of Resin D/HDDA/TPGDA/FX-13 72/8/20/10, 1.7 parts BCA, 63.3 parts M810, 2 parts Irgacure 651 and 0.5 parts L-540. It had a cloud point of 23° C. The solution was coated and cured at 10 m/min at 100 micron wet film thickness and with nonattenuated lamp. 0.5 Cerex was laminated to the coating and the laminate was postcured twice under similar conditions and washed and dried. Its properties are given in Table 5.

EXAMPLE 26

A solution made of 35 parts Resin D/HDDA/FX-13 72/28/10, 22 parts DBE-5, 43 parts methyl laurate, 2 parts Irgacure 651 and 0.5 parts L-540 had a cloud point of 25.8° C. It was coated 100 microns thick and precured at 10 m/min under full powered lamp, laminated to Cerex 0.5 and postcured twice more. The washed and dried membrane had the properties as shown in Table 5.

EXAMPLE 27

A solution containing 35 parts of 70/30 ratio of Resin K/HDDA, 65 parts methyl myristate, 2 parts Irgacure 651 and 0.5 parts L-540 had a cloud point of 24.2° C. The solution was coated 95 microns thick on a release paper, precured at 10 m/min with half powered lamp and laminated to Hollytex 3254. The laminate was postcured twice, washed and dried. It had low air flow and a high bubble point which indicates a tendency to collapse. It was brittle at the point of pleating and therefore non-suitable for coated fabrics.

EXAMPLE 28

A similar coating based On 35 parts of Resin L/HDDA in a ratio of 70/30, 9.9 parts isopropylmyristate, 55.1 parts isopropylpalmitate, 2 parts Irgacure 651 and 0.5 parts L-540 and a cloud point of 25° C. was similarly laminated to Cerex 0.85 oz./sq.yd. It produced similar results to that of the previous example and a similarly brittle product.

EXAMPLE 29

A solution made of 35 parts Resin C/HDDA/FX-13 in a ration of 80/20/7 was mixed with 50 parts M810, 15 parts BCA, 2 parts Irgacure 651, 0.4 parts DC193 and 0.1 parts L-549 had a cloud point of 18.4° C. The solution was coated and processed as in Example 1 using a coating thickness of 95 microns (Rod #30), speed of 10m/min, Hollytex 3256 support and precure intensity of 1.18 watt/cm. The resulting laminate had an opaque white smooth coating of good flexibility and handling characteristics. It had an air flow of 990 ml/min, kerosene bubble point of 2.79 bar, and water break through of 1.75 kg/$cm^2$.

EXAMPLE 30

A similar solution was made with Resin G replacing Resin C and a mixture of 36 parts M810 and 29 parts methyl laurate as solvents, such that the cloud point was 19.0° C. It was coated and processed as in Example 29 except that the precure intensity was 2.96 watt/cm. The resulting laminate had a similar appearance and mechanical characteristics. It had an air flow of 1140 ml/min, kerosene bubble point of 2.51 bar, and water breakthrough of 1.75 kg/$cm^2$.

EXAMPLE 31

A similar composition to that of Example 29 but with Resin I replacing Resin C and with a mixture of 51.1 parts M810 and 13.9 parts BCA had a cloud point of 21.8° C. The solution was coated and processed as in Example 29. The resulting film similarly had good mechanical properties and good appearance. It had an air flow of 100 ml/min., kerosene bubble point of 7.0 bar and water breakthrough of 5.5 kg/$cm^2$.

EXAMPLE 32

A solution was made with 35 parts of resin E/HDDA/TOCTAM in a ratio of 80/20/20, 60 parts DIBA, 5 parts DIOA, 2 parts Irgacure 651, 0.4 parts DC193 and 0.1 parts L-540. The solution was coated and processed as in Example 30. The resulting film had good mechanical behavior. It had an air flow of 780 ml/min, kerosene bubble point of 3.13 bar and water breakthrough of 3.0 kg/$cm^2$.

Table 6 refers to Examples 33 through 38.

TABLE 6

Properties of Unsupported Membranes

| Ex # | Wet Film Thickness (microns) | Curing Speed (m/min) | Void Volume (%) | Air Flow (ml/min, 5 $cm^2$ disc @80 cm $H_2O$) | Kerosene Bubble Point (bar) |
|---|---|---|---|---|---|
| 33 | 100 | 10.5 | 52.9 | 500 | 3.2 |
| 34 | 100 | 10.5 | | 622 | 2.0 |
| 35 | 100 | 10.5 | | 407 | 2.7 |
| 36 | 100 | 10.5 | | 266 | 4.7 |
| 37 | 130 | 10.0 | 57.7 | 560 | 1.93 |
| 38 | 130 | 10.0 | 57.2 | 550 | 1.71 |

EXAMPLE 33

An unsupported porous membrane was made by making a solution of 25 parts Resin M/HDDA 70/30 with 54.4 parts M810, 0.6 parts BCA, 2 parts Irgacure 651 and 0.5 parts DC193. The solution was coated and processed as in Example 32. The washed and dried film was opaque white with good handling characteristics. It had a void volume of 52.9%, a kerosene B. P. of 3.2 bar and an air flow of 500 ml/min for sections 100 microns thick.

EXAMPLE 34

An unsupported porous film was made similar to Example 33 but with 40 parts Resin F/BDDA 80/20 mixture and 57.5/2.5 ratio of M810/BCA. The resulting membrane had an air flow of 622 ml/min and a kerosene B. P. of 2.0 bar.

EXAMPLE 35

An unsupported membrane was made similar to Example 33 but with 45 parts Resin F/HDDA 80/20 and 55 parts of M810 gave a white and flexible film with a kerosene B.P. of 2.7 bar and air flow of 407 ml/min.

EXAMPLE 36

A similar membrane to that in Example 35 but with HDDA substituted by PEA produced a more flexible membrane with a kerosene B.P. of 4.7 bar and air flow of 266 ml/min.

EXAMPLE 37

A solution was made of 40 parts Resin E/HDDA 80/20, 48 parts M810, 12 parts BCA, 2 parts Irgaeure 651 and 0.5 parts DC193. The solution was hazy but stable at room temperature. The solution was coated with WWR #70 on a release paper and cured twice with a full powered 200 w/inch lamp (4.5 watt/cm effective intensity) at 10 m/min, removed from the release paper, washed and dried. The resulting membrane had good strength and handling characteristics with a void volume of 57.7%, air flow of 560 ml/min, and kerosene bubble point of 1.93 bar.

EXAMPLE 38

The same solution as in Example 37 was centrifuged. The solution became clear and a fraction of 6% of the solution was found as a viscous heavier layer. The layer was analyzed to be a higher molecular weight fraction of the resin. The clear fraction was coated and processed as above. The resulting porous film had similar handling and mechanical characteristics with similar flow properties with air flow of 550 ml/min. A kerosene bubble point of 1.71 bar and a void volume of 57.2%.

TABLE 7

| Example # | Polymer | Monomer | Support | Precure dose (j/$cm^2$) | Impregnation Solution in Freon 113: Compound | Impregnation Solution in Freon 113: % Solids | Kerosene Bubble Point (psi) | Air Flow (cc/min $cm^2$ 80 cm $H_2O$) | Water Break Through (kg/$cm^2$) | % Water Penetration* |
|---|---|---|---|---|---|---|---|---|---|---|
| 39 | Resin D/HDDA | FX-13 | Cerex 0.6 | 0.20 | — | — | 22 | 375 | 3.0 | |
| 40 | Resin D/HDDA | — | Cerex 1.0 | 0.17 | — | — | 23 | 262 | 0.0 | |
| 41 | Resin D/HDDA | — | Cerex 1.0 | 0.17 | FC-725 | 1 | — | 189 | 0.9 | |
| 42 | Resin D/HDDA | — | Cerex 1.0 | 0.17 | FC-725 | 2 | — | 105 | 1.5 | |
| | Resin F/HDDA | FX-13 | Unsupported | — | — | — | 33.7 | 86 | 2.5 | |

*% water penetration is defined as the % of weight gain upon 24 hour water contact on the coated side without applied pressure. The notation "Wettable" means that the membrane became soaked with water by that time.

EXAMPLE 39

A solution composed of 35 parts of Resin D/HDDA/FX-13 in a ratio of 72/28/10, 62 parts M810, 3 parts BCA, 2 parts Irgacure 651 and 0.5 parts L-540 was coated with WWR#55 (wet thickness 100 microns) on a release paper at 7m/min. The coating was precured with half powered lamp (3.36 watt/cm), laminated to Cerex 0.6 oz. and postcured through two fully powered lamps on a continuous coating and laminating line. The washed and dried sample had good flexibility, handability and water repellency.

EXAMPLE 40

A solution composed of 35 parts Resin D/HDDA in a ratio of 63/37, 57 parts M810, 8 parts methyl laurate, 2 parts Irgacure 184, 0.1 parts L-540 and 0.4 parts DC193 was coated and processed as in Example 39 except that a precure intensity of 1.94 watt/cm was employed using a fully powered lamp attenuated with a metal screen. The resultant laminate was instantaneously wettable.

EXAMPLE 41

A sample of laminate from Example 40 was immersed in a solution of a perfluoro, water repellent polymer, FC-725 (a product of 3M). The solution was made into 1% solids solution in Freon 113 by first stripping off the original butyl acetate solvent in the original FC-725 product and redissolving it in the Freon solvent. The impregnated laminate was allowed to dry out and tested for its flow properties and hydrophobicity. The impregnation caused a partial loss of flow properties and a moderate level of hydrophobicity as judged by the water breakthrough pressure of 0.9 kg/$cm^2$.

EXAMPLE 42

The same as Example 41 except that 2% solids FC-725 solution was used for impregnation. Air flow dropped and water breakthrough increased to 1.5 atm.

EXAMPLE 48

Similar impregnation with 2% Zonyl TBC reduced air flow to 6.6 ml/min $cm^2$ and the membrane was very slowly wettable.

TABLE 8

| Example # | Polymer | Monomer | Support | Precure dose ($j/cm^2$) | Impregnation Solution in Freon 113: Compound | Impregnation Solution in Freon 113: % Solids | Kerosene Bubble Point (psi) | Air Flow (cc/min $cm^2$ 80 cm $H_2O$) | Water Break Through ($kg/cm^2$) | % Water Penetration* |
|---|---|---|---|---|---|---|---|---|---|---|
| 49 | Resin D/HDDA | FX-13 | Cerex 0.5 | 0.27 | — | — | 18 | 446 | 3.5 | 1.7 |
| 50 | Resin D/HDDA | TOCTAM | Cerex 0.5 | 0.27 | — | — | 18 | 506 | 1.5 | Wettable |
| 51 | Resin D/HDDA | TOCTAM | Cerex 0.5 | 0.27 | — | — | 18 | 476 | 2.0 | 11.7 |
| 52 | Resin D/HDDA | LA | Cerex 0.5 | 0.27 | — | — | 17 | 266 | 2.0 | Wettable |
| 53 | Resin D/HDDA | LA | Cerex 0.5 | 0.27 | — | — | collapsed structure | | | |
| 54 | Resin D/HDDA | TOCTAM | Cerex 0.85 | 0.27 | — | — | 29 | 250 | 2.17 | |
| 55 | Resin F/HDDA | FX189 | Hollytex 3256 | 0.04 | — | — | 31 | 200 | 2.0 | |
| 56 | Resin F/HDDA | FC5165 | Hollytex 3256 | 0.04 | — | — | 34 | 196 | 3.0 | |
| 57 | Resin F/HDDA | FX13 | Hollytex 3256 | 0.27 | — | — | 30 | 220 | 1.4 | |
| 58 | Resin F/HDDA | FX13 | Hollytex 3256 | 0.27 | — | — | 31 | 220 | 3.5 | |
| 59 | Resin D/HDDA | TOCTAM | Cerex 0.85 | 0.27 | — | — | 58 | 76 | 4.2 | |
| 60 | Resin F/HDDA | FX14 | Hollytex 3256 | 0.27 | — | — | 31 | 196 | 2.0 | |
| 61 | Resin D/HDDA | FX13/TOCTAM | Cerex 0.5 | 0.27 | — | — | 32 | 273 | 2.3 | |

*% water penetration is defined as the % of weight gain upon 24 hour water contact on the coated side without applied pressure. The notation "Wettable" means that the membrane became soaked with water by that time.

EXAMPLE 43

A solution composed of 50 parts of Resin F/HDDA 85/15, 50 parts M810, 2 parts Darocur 1116 and 0.4 parts FC-430 was coated on a siliconized polyester sheet with WWR#70 (130 microns wet thickness). The coating was cured by passing three times under a fully powered lamp at 8 m/min. The unsupported membrane was removed from the carrier sheet and washed thoroughly in Freon. The resulting membrane had good strength and flexibility. It had a void volume of 46%, kerosene bubble point of 36 psi and air flow of 45 ml/min $cm^2$ at 80cm water pressure. It was instantaneously wettable.

EXAMPLE 44

The above unsupported membrane was impregnated with 0.6% FC-725 solution in Freon as in Example 41. Air flow dropped to 28 ml/min cm2 and the membrane was still instantaneously wettable.

EXAMPLE 45

The same as above but with 1% FC-725. Air flow dropped to 18 ml/min cm2 and the membrane was still slowly wettable.

EXAMPLE 46

The same as above with 2% FC-725. Air flow dropped to lower than 2 ml/min $cm^2$. The membrane was very slowly wettable.

EXAMPLE 47

Similar impregnation with Zonyl TBC, an ester derivative of a perfluoro alkanol made by DuPont, at 1% solids in FREON 113 lowered air flow down to 30 ml/min $cm^2$ and the membrane was still slowly wettable.

EXAMPLE 49

A solution composed of 35 parts Resin D/HDDA/FX-13 at a ratio of 72/28/10, 63 parts M810, 2 parts Irgacure 651, 0.1 parts L-540 and 0.4 parts DC193 which had a cloud point of 19.3° C. coated 95 microns thick at 10 m/min at full lamp intensity, laminated to Cerex 0.5 and post cured twice under similar conditions. The washed and dried sample had good flow properties, good mechanical strength and flexibility and very good water breakthrough and a very low percent of water gain upon 24 hours exposure to water.

EXAMPLE 50

A similar composition as Example 49 was produced under similar conditions but with TOCTAM instead of FX-13 and a ratio of 53/12 of M810/methyl laurate as solvents such that the cloud point was 20.7° C. and the membrane had moderate hydrophobicity.

EXAMPLE 51

A membrane as prepared in Example 49 but with a ratio of 72/28/20 of Resin D/HDDA/TOCTAM (higher level of TOCTAM) and a solvent composition of 47/18 of M810/methyl laurate. The formulation had a cloud point of 19.7° C. and the resultant membrane had good flow and hydrophobic characteristics.

EXAMPLE 52

A similar composition to that of Example 49 but with laurylacrylate (LA) instead of FX-13 and 4/61 parts of BCA/M810 as the solvent. The solution had a cloud point of 20.2° C. and the resultant membrane had moderate flow and hydrophobic properties.

EXAMPLE 53

A similar composition to that prepared in Example 52 but with a 72/28/20 ratio of Resin D/HDDA/LA and 8/57 parts BCA/M810 as the solvents. A cloud point of 21° C. was determined. This composition produced a transparent nonporous coating.

EXAMPLE 54

A membrane as prepared in Example 49, but with a 81/19/20 ratio of Resin C/HDDA/TOCTAM and a solvent ratio of 49.4/15.6 of M810/M12. The formulation had a cloud point of 20° C. It was coated in the same way as Example 11 except that Cerex 0.85 oz. was used. The resultant membrane had good flow and hydrophobicity and very good mechanical properties. It had an extensibility of 35% before the appearance of holes in the coating.

EXAMPLE 55

A solution was made with 40 parts Resin F/HDDA/FX189 in a ratio of 90/10/7 and with 48 parts M810, 12 parts BCA, 2 parts Irgacure 651, 0.4 parts DC193 and 0.1 parts L540. The solution had a cloud point of 20.4° C. The solution was coated 95 microns thick at 7 m/min under a full lamp intensity, attenuated with a metal screen to effective intensity of 0.44 watt/cm. The precured membrane was laminated to Hollytex 3256 support and postcured twice under similar conditions. The resulting film had good mechanical and handling characteristics and properties as detailed in Table 8.

EXAMPLE 56

A membrane was made as in Example 55 but with FC5165 substituting for FX189 and with solvent composition of 47 parts M810, 13 parts BCA, 2 parts Irgacure 651, 0.4 parts DC 193 and 0.1 parts L540. The solution had a cloud point of 20.1° C. The resulting membrane had good mechanical and handling characteristics with properties as detailed in Table 8.

EXAMPLE 57

A solution was made with 40 parts resin F/HDDA/FX13 at a ratio of 80/20/3 and with 52 parts M810, 8 parts BCA, 2 parts Irgacure 651, 0.4 parts DC193 and 0.1 parts L540. The solution had a cloud point of 19.8° C. The solution was coated 95 microns thick at 10 m/min at half lamp intensity laminated to Hollytex 3256 support and postcured twice at the same speed under full lamp intensity. The washed and dried samples had good flow and mechanical properties. The properties are detailed in Table 8.

EXAMPLE 58

A solution made of 40 parts Resin F/HDDA/FX13 at a ratio of 80/20/25, a solvent composition of 45.2 parts of M810 and 14.8 parts of BCA, 2 parts Irgacure 651, 0.4 parts DC193 and 0.1 parts L540 and a cloud point of 20.9° C. The solution was used to make a membrane under the same conditions of Example 57. The washed and dried samples had good flow, mechanical and hydrophobic properties as detailed in Table 8.

EXAMPLE 59

A solution was made with 35 parts Resin D/HDDA/TOCTAM in a ratio of 81/19/50 and with 32.2 parts M810, 32.8 parts M12, 2 parts Irgacure 651, 0.4 parts DC193 and 0.1 parts L540. The solution had a cloud point of 20.4° C. It was coated 95 microns thick at 7 m/min at half lamp intensity, laminated to Cerex 0.85 and postcured twice under full lamp intensity at a similar speed. The washed and dried samples had low flow properties, high bubble points and high water breakthrough as detailed in Table 8.

EXAMPLE 60

A solution was made as in Example 56, but with FX14 substituting for FX189 and with solvent composition of 11.9 parts BCA, 48.1 parts M810, 2 parts Irgacure 651, 0.4 parts DC193 and 0.1 parts L540. The solution had a cloud point of 19.4° C. The solution was used to make a membrane under the same conditions of Example 56. The resulting membrane had good mechanical and handling characteristics with properties as detailed in Table 8.

EXAMPLE 61

A solution composed of 40 parts Resin D/HDDA/TOCTAM/FX13 at a ratio of 72/28/18/2, 20.8 parts M12, 39.2 parts M810, 2 parts Irgacure 651 and 0.5 parts L-540 had a cloud point of 22.8° C. It was used to make a coated laminate as in Example 49. The coated laminate had good mechanical and handling properties. Its other properties are given in Table 8.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A cured hydrophobic microporous membrane laminated to a support material, said membrane having a thickness of about 0.1 inches or less, which in its part cure and full cure stages is the rapidly polymerized reaction product of ultraviolet or electron beam polymerized monomer and oligomer components comprising:

a primary membrane oligomer component selected from the group comprising acrylic polyester urethanes derived through reaction of a polyester polyol and a polyisocyanate; and a secondary membrane monomer component selected from the group comprising:

1, 1, 3, 3-tetramethylbutylacrylamide; a perfluoromonomer of the general formula

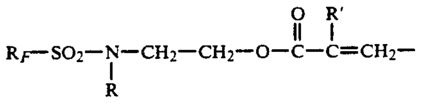

where $R_F$ is the perfluoroalkyl radical $C_kF_{2K+1}$ where k is 6 to 10, R is $C_mH_{2m+1}$ where m=2 to 4, and R' is hydrogen or methyl; and a perfluoroacrylic monomer of the general formula

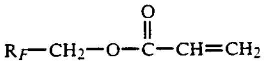

where $R_F=C_zF_{2z+1}$ and z=6 to 8;

said secondary membrane monomer being in an amount effective to impart hydrophobic properties to said membrane.

2. The membrane of claim 1 wherein said primary membrane oligomer component is a mixture of one or more acrylic polyester urethanes selected from the following general formulas $R_1-(R_2-R_3)_n-R_2-R_1$ (I)

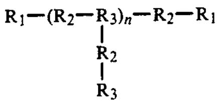
(II)

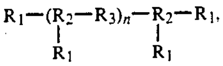
(III)

where $R_1$ is the radical of a hydroxyterminated acrylate monomer, $R_2$ is a dicarbamate or tricarbamate group, $R_3$ is a polymester polyol, and n=0 to 4.

3. The membrane of claim 1 wherein said components further comprises a monomer component selected from difunctional and trifunctional crosslinking monomers.

4. The membrane of claim 1 wherein said components further comprises a polymer modifying monomer.

5. The membrane of claim 1 wherein said microporous membrane is laminated to a support material.

6. A hydrophobic microporous membrane structure comprising:

A. ultraviolet or electron beam rapidly polymerized monomer and oligomer components which in its part cure and full cure stages form a microporous membrane comprising:

1. a primary membrane oligomer component selected from acrylic polyester urethanes derived through reaction of a polyester polyol and a polyisocyanate of the following general formulas $R_1-(R_2-R_3)_n-R_2-R_1$ (I)

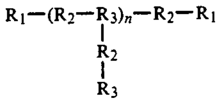
(II)

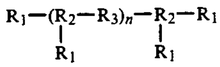
(III)

wherein $R_1$ is the radical of a hydroxyterminated acrylate monomer, $R_2$ is a dicarbamate or tricarbamate group, $R_3$ is a polyester polyol, and n=0 to 4; and 2. a secondary membrane monomer component in an amount effective to impart hydrophobic barrier properties to said microporous membrane selected from the group comprising (a) 1, 1, 3, 3-tetramethylbutylacrylamide, (b) a perfluoromonomer of the general formula

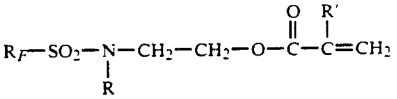

where $R_F$ is the perfluoroalkyl radical of $C_kF_{2K+1}$ where k is essentially 6 to 10, R is $C_mH_{2m+1}$ where m=2 to 4, and R' is hydrogen or methyl; and (c) a perfluoroacrylic monomer of the general formula

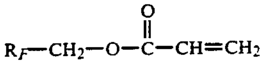

where $R_F$ is $C_zF_{2z+1}$ and z=6 to 8;

said microporous membrane having a thickness of about 0.1 inches or less; and

B. a support material laminated to at least one surface of said microporous membrane.

7. The structure of claim 6 wherein said polymerized monomer and oligomer components further comprises difunctional and trifunctional crosslinking monomers selected from 1,4-butanedioldiacrylate, 1,6-hexanedioldiacrylate, trimethylolpropanetriacylate, tetraethylene glycol diacrylate, tripropylene glycol diacrylate, neopentyl glycol diacrylate, polyethylene glycol diacrylates, polypropylene glycol diacrylates 1,3 butylene glycol diacrylate, diacrylates and triacrylates derived from ethoxylated and propoxylated diols and triols.

8. The structure of claim 6 wherein said polymerized monomer and oligomer components further comprises polymer modifying monomers selected from acrylic acid, N-vinylpyrrolidone, N-vinylcaprolactam, 2-ethylhexylacrylate, phenoxyethylacrylate, isobornylacrylate, dicyclopentadienyl ethyl acrylate, tetrahydrofurfuyl acrylate, ethyldiglycolacrylate, hydroxyethylacrylate, hydroxypropylacrylate, butyl carbanylethyacrylate, isobutoxymethylacrylamide.

9. A process for preparing a membrane laminate, comprising:

A. mixing into a liquid vehicle to form a solution 1. oligomers selected from the group comprising acrylic polyester urethanes derived through reaction of a polyester polyol and a polyisocyanate, and 2. monomers selected from the group comprising (a) 1, 1, 3, 3-tetramethylbutylacrylamide, (b) a perfluoromonomer of the general formula

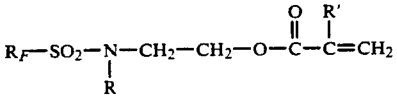

where $R_F$ is the perfluoroalkyl radical $C_kF_{2K+1}$ where k is 6 to 10, R is $C_mH_{2m+1}$ where m=2 to 4, and R' is hydrogen or methyl; and (c) a perfluoroacrylic monomer of the general formula

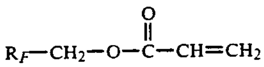

said liquid vehicle being a solvent for said oligomers and monomers and a nonsolvent for polymers formed from, and otherwise chemically inert to, said oligomers and polymers;

B. forming a layer of said solution;

C. partially polymerizing with ultraviolet or electron beam irradiation said oligomers and said monomers in the presence of atmospheric oxygen to form a partially polymerized layer;

D. contacting a support material layer to said partially polymerized layer;

E. completing the polymerization of said partially polymerized layer with ultraviolet or electron beam irradiation, said monomers being in an amount sufficient to impart hydrophobic barrier properties to the completely polymerized layer; and F. removing said liquid vehicle to form a microporous membrane-support layer laminate.

10. The process of claim 9 wherein said oligomers mixed into said liquid vehicle are selected from acrylic polyester urethanes selected from the following general formulas $R_1-(R_2-R_3)_n-R_2-R_1$ (I)

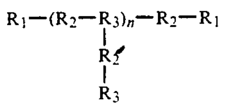
(II)

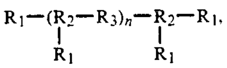
(III)

where $R_1$ is the radical of a hydroxyterminated acrylate monomer, $R_2$ is a dicarbamate or tricarbamate group, $R_3$ is a polyester polyol, and n is 0 to 4.

11. The process of claim 9 further comprising mixing into said solution prior to polymerization a monomer selected from difunctional and trifunctional crosslinking monomers.

12. The process of claim 9 further comprising mixing into said solution prior to polymerization a polymer modifying monomer.

13. A process for preparing a membrane laminate, comprising:

A. mixing into a liquid vehicle acrylic polyester oligomers derived through reaction of a polyester polyol and a polyisocyanate and monomers which are rapidly polymerizable under electron beam or ultraviolet irradiation to form a first solution, said monomers being selected from the group comprising 1. 1, 1, 3, 3-tetramethylbutylacrylamide,
2. a perfluoromonomer of the general formula

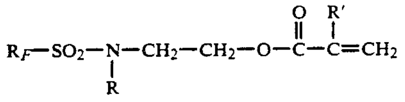

where $R_F$ is $C_kF_{2K+1}$ where k is 6 to 10, R is $C_mH_{2m+1}$ where m=2 to 4, and R' is hydrogen or methyl; and 3. a perfluoroacrylic monomer of the general formula

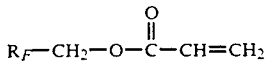

where $R_F$ is $C_zF_{2z+1}$ and z=6 to 8;

and further being in an amount sufficient to impart hydrophobic barrier properties to the membrane laminate prepared by the process; said liquid vehicle being a solvent for said oligomers and monomers and a nonsolvent for polymers formed from, and otherwise chemically inert to, said oligomers and polymers;

B. forming a layer of said solution;

C. partially polymerizing with ultraviolet or electron beam irradiation said oligomers and said monomers in the presence of atmospheric oxygen to form a partially polymerized layer;

D. contacting a support material layer to said partially polymerized layer;

E. completing the polymerization of said partially polymerized layer with ultraviolet or electron beam irradiation;

F. forming a second layer from solution as defined in step A;

G. partially polymerizing with ultraviolet or electron beam irradiation oligomers and monomers in said second layer in the presence of atmospheric oxygen to form a second partially polymerized layer;

H. contacting the coated side of the laminate formed in step E to said second partially polymerized layer;

I. completing the polymerization of said second partially polymerized layer with ultraviolet or electron beam radiation; and J. removing said liquid vehicle from both polymerized layers.

14. A process for preparing a hydrophobic microporous membrane laminate, comprising:

A. mixing into a liquid vehicle to form a solution 1. acrylic polyester urethane oligomers derived through reaction of a polyester polyol and a polyisocyanate selected from the group comprising urethanes of the following general formulas $R_1-(R_2-R_3)_n-R_2-R_1$ (I)

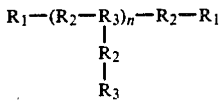
(II)

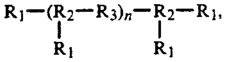
(III)

where $R_1$ is the radical of a hydroxyterminated acrylate monomer, $R_2$ is a dicarbamate or tricarbamate group, $R_3$ is a polyester polyol, and n is 0 to 4; and 2. monomers selected from the group comprising
(a) 1, 1, 3, 3-tetramethylbutylacrylamide,
(b) a perfluoromonomer of the general formula

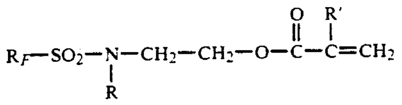

where $R_F$ is the perfluoroalkyl radical of $C_kF_{2K+1}$ where k is 6 to 10, R is $C_mH_{2m+1}$ where m is 2 to 4, and R′ is hydrogen or methyl; and (c) a perfluoroacrylic monomer of the general formula

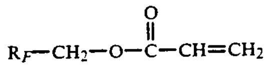

where $R_F$ is $C_zF_{2z+1}$ and z is 6 to 8, and being in an amount sufficient to impart hydrophobic barrier properties to the membrane laminate prepared by the process;

said liquid vehicle being a solvent for said oligomers and monomers and a nonsolvent for polymers formed from said oligomers and said monomers and otherwise chemically inert to said oligomers and monomers;

B. forming a layer of said solution;

C. partially polymerizing the oligomers and polymers of said solution in the presence of atmospheric oxygen with ultraviolet or electron beam irradiation to form a partially polymerized layer;

D. contacting a support material layer to said partially polymerized layer;

E. completing the polymerization of said partially polymerized layer with ultraviolet or electron beam irradiation; and F. removing said liquid vehicle to form a microporous membrane-support layer laminate.

15. The process of claim 14 further comprising mixing into said solution prior to polymerization a monomer selected from difunctional and trifunctional cross-linking monomers.

16. The process of claim 14 further comprising mixing into said solution prior to polymerization a polymer modifying monomer.

17. The process of claim 14 further comprising mixing into said solution prior to polymerization a surfactant.

18. The process of claim 14 wherein said support material is selected from woven and nonwoven fabric and paper.

19. A method of providing a porous web with a surface-adhering coating with negligible penetration into the pores of the web, that comprises, moving a surface carrying an electron-curable liquid coating along a predetermined path; passing a porous web for laminating contact with said coating along said path; subjecting the coating to electron beam radiation through the web before such laminating while adjusting the radiation dose only partially to cure the coating before lamination, such that it is soft or tacky, with the laminating step effecting surface spreading and adhesion with the web substantially without penetration into the pores, and immediately subjecting the laminated web and partially cured coating to further electron beam radiation of greater dose and also directed thorough said web fully to cure the coating.

20. A method of laminating a support material to an ultraviolet or electron beam polymerizable coating material, comprising:

(a) mixing into a liquid vehicle to form a homogeneous solution, polymeric precursor material selected from the group comprising oligomers and monomers which are rapidly polymerizable by ultraviolet or electron beam irradiation, said liquid vehicle being a solvent for said oligomers and said monomers, and a nonsolvent for the polymerized product of said oligomers and said monomers;

(b) forming a thin layer of said solution;

(c) irradiating said solution with electron beam or ultraviolet irradiation sufficient to partially polymerize said oligomers and monomers in said solution to form a partially polymerized layer;

(d) contacting said partially polymerized layer with a support material; and (e) completing polymerization of said partially polymerized layer in contact with said support material by irradiation with electron beam or ultraviolet irradiation such that said support material adheres to said polymerized layer.

21. The method of claim 20 wherein after contacting the support material to the partially polymerized layer, the irradiation is directed thorough the support material.

22. The method of claim 20 wherein the partial polymerization step is conducted in the presence of atmospheric oxygen.

23. The method of claim 20 further including the steps of partially polymerizing a second solution layer containing oligomers and monomers with electron beam or ultraviolet irradiation, contacting said second partially polymerized layer with the laminated material at the polymerized coating interface and completing polymerization of the second partially polymerized layer with electron beam or ultraviolet irradiation.

24. The method of claim 20 wherein the coating surface of a second laminate prepared according to steps (a) through (e) is contacted to the coating surface of the first laminate and the contacted coating surfaces are irradiated with ultraviolet or electron beam irradiation.

* * * * *

UNITED STATES PATENT AND TRADEMARK OFFICE

CERTIFICATE OF CORRECTION

PATENT NO. : 5,126,189

DATED : June 30, 1992

INVENTOR(S) : Tanny, et al.

It is certified that error appears in the above-identified patent and that said Letters Patent is hereby corrected as shown below:

Column 3, line 16, delete "microporous prepared" and insert --microporous membrane prepared--;

Column 3, line 47, delete "vi--w" and insert --view--;

Column 3, line 49, delete "&illustrating" and insert --illustrating--;

Column 6, line 52, delete "tne" and insert --the--;

Column 7, line 3, delete "hydrophobiciry" and insert --hydrophobicity--;

Column 7, line 11, delete "Or" and insert --or--;

Column 7, line 34, delete "Oligomers" and insert --oligomers--;

Column 8, line 23, delete "&t" and insert --it--;

Column 21, line 54, delete "26" and insert --25--;

Column 24, line 39, the indentation of this line should not be there and should proceed after the word "with" on line 38;

UNITED STATES PATENT AND TRADEMARK OFFICE
CERTIFICATE OF CORRECTION

PATENT NO. : 5,126,189

DATED : June 30, 1992

INVENTOR(S) : Tanny, et al.

It is certified that error appears in the above-identified patent and that said Letters Patent is hereby corrected as shown below:

Column 25, line 50, delete "cm2" and insert --$cm^2$--;

Column 25, line 55, delete "cm2" and insert --$cm^2$--;

Column 31, before line 1, insert --where $R_F$ is $C_zF_{2z+1}$ and z = 6 to 8;--

Column 23, line 29, should go after line 15.

Signed and Sealed this

Twenty-third Day of November, 1993

Attest:

BRUCE LEHMAN

Attesting Officer

Commissioner of Patents and Trademarks